United States Patent
Shah et al.

(10) Patent No.: US 12,072,836 B2
(45) Date of Patent: Aug. 27, 2024

(54) FAST ARGUMENT LOAD IN A RECONFIGURABLE DATA PROCESSOR

(71) Applicant: SambaNova Systems, Inc., Palo Alto, CA (US)

(72) Inventors: Manish K. Shah, Austin, TX (US); Gregory Frederick Grohoski, Bee Cave, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/105,187

(22) Filed: Feb. 2, 2023

(65) Prior Publication Data

US 2023/0251994 A1 Aug. 10, 2023

Related U.S. Application Data

(60) Provisional application No. 63/308,246, filed on Feb. 9, 2022.

(51) Int. Cl.
*G06F 15/78* (2006.01)
*G06F 9/30* (2018.01)
(Continued)

(52) U.S. Cl.
CPC ............ *G06F 15/80* (2013.01); *G06F 9/3013* (2013.01); *G06F 9/44505* (2013.01); *G06F 15/7885* (2013.01)

(58) Field of Classification Search
CPC ... G06F 15/7867; G06F 15/7885; G06F 15/80
See application file for complete search history.

(56) References Cited

U.S. PATENT DOCUMENTS

2020/0159544 A1\* 5/2020 Shah .................... G06F 15/7871
2020/0159692 A1\* 5/2020 Shah ..................... G06F 13/364
(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Jacob Petranek
(74) *Attorney, Agent, or Firm* — Flagship Patents; Sikander M. Khan; Shaham Parvin

(57) ABSTRACT

A reconfigurable processor includes an array of configurable units connected by a bus system. Each configurable unit has a configuration data store, organized as a shift register, to store configuration data. The configuration data store also includes individually addressable argument registers respectively made up of word-sized portions of the shift register to provide arguments to the configurable unit. The configurable unit also includes program load logic shift data into the configuration data store, and argument load logic to directly load data into the argument registers without shifting the received argument data through the shift register. A program load controller is associated with the array to respond to a program load command by executing a program load process, and a fast argument load (FAL) controller is associated with the array to respond to an FAL command by executing an FAL process.

20 Claims, 11 Drawing Sheets

(51) Int. Cl.
    *G06F 9/445*     (2018.01)
    *G06F 15/80*     (2006.01)

(56) References Cited

U.S. PATENT DOCUMENTS

| | | | |
|---|---|---|---|
| 2020/0218683 A1* | 7/2020 | Grohoski | G06F 13/4027 |
| 2020/0356523 A1* | 11/2020 | Prabhakar | G06F 15/7867 |
| 2021/0011770 A1* | 1/2021 | Prabhakar | G06F 9/5027 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
Podobas et al, A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.

* cited by examiner

FAST ARGUMENT LOAD IN A RECONFIGURABLE DATA PROCESSOR

CROSS-REFERENCES AND INCORPORATIONS

This application claims the benefit of U.S. Provisional Patent Application No. 63/308,246, filed on Feb. 9, 2022, entitled "Fast Argument Load." This provisional application is hereby incorporated by reference for all purposes.

This application is further related to the following patent applications, which are hereby incorporated by reference for all purposes:

- U.S. Nonprovisional patent application Ser. No. 16/197,826, now U.S. Pat. No. 10,831,507 B2, filed Nov. 21, 2018, entitled "Configuration Load of a Reconfigurable Data Processor;"
- U.S. Nonprovisional patent application Ser. No. 16/536,192, now U.S. Pat. No. 11,080,227 B2, filed Aug. 8, 2019, entitled "Compiler Flow Logic for Reconfigurable Architectures;"
- U.S. Nonprovisional patent application Ser. No. 16/996,666, filed Aug. 18, 2020, entitled "Runtime Patching of Configuration Files;"
- U.S. Nonprovisional patent application Ser. No. 17/322,697, filed May 17, 2021, entitled "Quiesce Reconfigurable Data Processor;"
- US Nonprovisional patent application Ser. No. 18/105,189, filed Feb. 2, 2023, entitled "A Reconfigurable Data Processor with Fast Argument Load using a Runtime Program on a Host Processor."

The following are incorporated by reference for all purposes:

Prabhakar et al., "Plasticine: A Reconfigurable Architecture for Parallel Patterns," *ISCA '17*, Jun. 24-28, 2017, Toronto, ON, Canada; and Koeplinger et al., "Spatial: A Language and Compiler for Application Accelerators," *Proceedings of the 39th ACM SIGPLAN Conference on Programming Language Design and Implementation* (PLDI), Proceedings of the 43rd International Symposium on Computer Architecture, 2018.

BACKGROUND

Technical Field

The technology disclosed relates to loading argument registers in a coarse-grained reconfigurable architecture processor from a host processor during runtime.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including field programmable gate arrays FPGAs, can be configured to implement a variety of functions more efficiently or faster than might be achieved using a general-purpose processor executing a computer program. So called coarse-grained reconfigurable architectures (e.g., CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See Prabhakar, et al. as referenced above.

Configuration of reconfigurable processors involves compilation of a configuration description to produce a configuration file, referred to sometimes as a bitstream or bit file, and distributing the configuration file to the configurable units on the processor. To start a process, the configuration file must be loaded for that process. To change a process, the configuration file must be replaced with the new configuration file.

The configuration file can include parameters or arguments for use by the graphs implemented by the configuration file once loaded into the coarse-grained reconfigurable (CGR) units. These locations may be updated more often than other parts of the configuration file, so it is inefficient to replace the entire configuration file just to update an argument.

BRIEF DESCRIPTION OF THE DRAWINGS

The technology will be described with reference to the drawings, in which.

Figure 1:
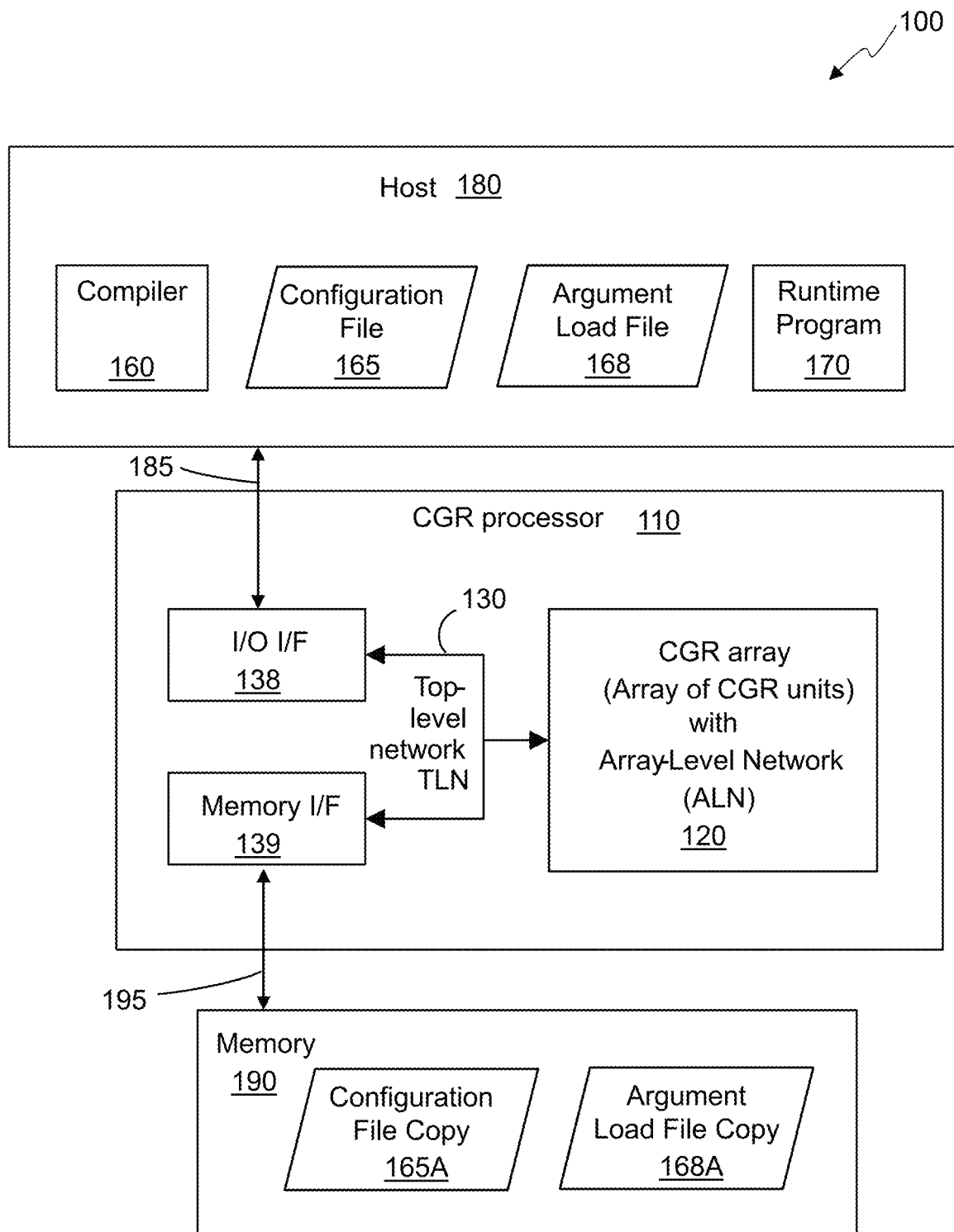
FIG. 1 illustrates an example system including a coarse-grained reconfigurable (CGR) processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

A technology is described which enables runtime modification of configuration files controlling execution behavior. A data processing system is described that includes a pool of reconfigurable data flow resources, including fused compute and memory units (FCMUs), pattern memory units (PMUs), pattern compute units (PCUs), and/or switches. A reconfigurable data processing unit (RDU) in the data processing system includes of an array of coarse-grained reconfigurable units (CGR array), a bus system, and a processor memory. Reconfigurable units in the CGR array each include a serial chain of registers to store a configuration bit stream. Each configuration bit stream includes individually addressable argument registers that store word-sized portions of the bit stream and specify execution parameters. The CGR array can be configured to execute data processing applications. A program load process can be used to load initial configurations into the configuration bit streams, and a fast argument load (FAL) process can be used to dynamically load new values into the argument registers.

The data processing system further includes a host processor, a compiler, and a host memory. The host processor is configured with a runtime program (Runtime) to receive one or more configuration files for the applications, and one or more argument data files specifying modifications to the argument registers. The host processor communicates with the CGR array via an interface unit, the interface unit being one of the configurable units in the CGR array. The CGR array further includes multiple address generation and coalescing units (AGCUs), including a master AGCU (MAGCU) and one or more slave AGCUs. The MAGCU can act as the interface unit and can communicate with Runtime. MAGCU further includes a program load controller to perform the program load process to load configuration files into configurable units of the CGR array, and an FAL controller to perform the FAL process to modify individual argument registers.

In operation, a software development kit (SDK) processes the data processing applications to generate an execution file. The compiler processes the execution files to generate configuration files. The compiler also generates metadata, including argument data used to set portions of configuration files. The compiler provides the configuration file(s) and argument data file(s) to Runtime.

Runtime executes the program load process by writing the configuration file(s) from the host memory to the processor memory, writing the starting physical address of the configuration file(s) to a program load address register in MAGCU, and triggering the program load process by setting a program load bit of a program control register in MAGCU. MAGCU responds by reading chunks of configuration data from the processor memory and distributing the configuration data to configurable units in the CGR array. Runtime waits for the program load process to end by polling a tile status register in MAGCU, or by getting an interrupt from MAGCU signaling completion. Once the program load process is completed, Runtime can trigger execution by resetting the program load bit and setting an execution bit of the program control register. The CGR array is then running.

After allowing the CGR array to run for a first time period, Runtime can perform the FAL process to modify argument registers. To perform the FAL process, Runtime first pauses the CGR array by clearing the execution bit and setting a quiesce bit of the program control register. MAGCU reports quiesce ready by setting a quiesce ready bit of the tile status register, or by generating an interrupt to Runtime. Once the CGR array is paused, Runtime can receive updated argument load file(s) from the compiler and write the argument load file(s) from the host memory to the processor memory. Runtime then triggers the FAL process by writing the starting physical address of the argument load file(s) to an FAL address register in MAGCU, writing a size of the argument load file(s) to an argument load size register in MAGCU, clearing the quiesce bit of the program control register, and setting an FAL bit of the program control register. MAGCU will respond by reading chunks of (value, control) tuples from the argument load file(s), and sending (value, control) tuples, one tuple at a time, to addressed configurable units in the CGR array. Note that the individual argument registers provide multiple access methods. Bits can be serially shifted into argument registers, for example during the program load process, or they can be written to argument registers in parallel, for example, during the FAL process. Runtime recognizes that the FAL process is complete by polling the tile status register in MAGCU or by receiving an interrupt from MAGCU. Runtime can then restart execution by clearing the FAL bit and setting the execute bit of the program control register.

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms comprising and consisting have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term coupled is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term connected is used to indicate a direct connection, such as electrical, optical, electromagnetic, or mechanical, between the things that are connected, without any intervening things or devices.

The term configured (to perform a task or tasks) is a broad recitation of structure generally meaning "having circuitry that" performs the task or tasks during operation. As such, the described item can be configured to perform the task even when the unit/circuit/component is not currently on or active. In general, the circuitry that forms the structure corresponding to "configured to" may include hardware circuits, and may further be controlled by switches, fuses, bond wires, metal masks, firmware, and/or software. Similarly, various items may be described as performing a task or tasks, for convenience in the description. Such descriptions should be interpreted as including the phrase "configured to." Reciting an item that is configured to perform one or more tasks is expressly intended not to invoke 35 U.S.C. 112, paragraph (f) interpretation for that unit/circuit/component. More generally, the recitation of any element is expressly intended not to invoke 35 U.S.C. $112, paragraph (f) interpretation for that element unless the language "means for" or "step for" is specifically recited.

As used herein, the term based on is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase "based on" is thus synonymous with the phrase "based at least in part on."

The following terms or acronyms used herein are defined at least in part as follows:

AGCU—address generator (AG) and coalescing unit (CU).

AI—artificial intelligence.

ALN—array-level network—also referred to as a bus system connecting an array of configurable units.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches. A CGR unit may be referred to as a configurable unit or a reconfigurable unit. The three terms are used interchangeably herein.

CU—coalescing unit.

Dataflow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a metapipeline at the graph execution level (typically a sequence of logical operations that are to be repetitively executed) that enables correct timing and loop control of node-level operations of the configured graph. Gate-level pipelines are usually hard wired and unchangeable, whereas metapipelines are configured at the CGR processor, CGR array level, and/or GCR unit level.

Pipeline Stages—a pipeline is divided into stages that are coupled with one another to form a pipe topology.

PMU—pattern memory unit—a memory unit that can locally store data according to a programmed pattern.

CGR Array—an array of CGR units, coupled with each other through an array-level network (ALN), and coupled with external elements via a top-level network (TIN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLN—top-level network—Also referred to as an internal network.

Implementations

The architecture, configurability, and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. Also included is deciding what arguments may need to be updated before further execution of the graph, even if the graph's computational structure itself doesn't need to be updated.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an I/O interface 138, and a memory interface 139. Array of CGR units 120 is coupled with I/O interface 138 and memory interface 139 via an internal network 130 which may be part of a top-level network (TLN). Host 180 communicates with I/O interface 138 via system data link 185 (e.g. a PCIe bus, Ethernet, or InfiniBand), and memory interface 139 communicates with memory 190 via memory bus 195. Array of CGR units 120 may further include compute units and memory units that are connected with an array-level network (ALN), or bus system, to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include, a computer such as further described with reference to FIG. 2. Host 180 runs runtime processes, as further referenced herein, and may also be used to run computer programs, such as the compiler 160 further described herein with reference to FIG. 12. In some implementations, the compiler may run on a computer that is similar to the computer described with reference to FIG. 2, but separate from host 180.

CGR processor 110 may accomplish computational tasks by executing a configuration file 165 (for example, a PEF file) which includes a plurality of sub-files. For the purposes of this description, a configuration file corresponds to a dataflow graph, or a translation of a dataflow graph, and may further include initialization data. A compiler 160 compiles the high-level program to provide the configuration file 165. The compiler 160 may also include argument data in an argument load file 168. The argument data specifies execution parameters of the dataflow graph. In some implementations, the arguments are specified by the users. The configuration file 165 can include initial values for arguments and the argument load file can provide updated values for the arguments to be loaded after an initial execution time for the configuration file 165. The argument load file may, in some implementations, include a list of (value, control) tuples specifying values to be written to argument registers, with the list containing a (value, control) tuple for each argument register to be written during a single invocation of an argument load process.

Runtime program 170 may install the configuration file 165 in CGR processor 110. In some implementations described herein, a CGR array is configured by programming one or more configuration data stores with all or parts of the configuration file 165. A single configuration data store may be at the level of the CGR processor 110 or the CGR array 120, or a CGR unit may include an individual configuration data store. The configuration file 165 may include configuration data for the CGR array 120 and CGR units in the CGR array 120 and link the computation graph to the CGR array 120. Execution of the configuration file by CGR processor 110 causes the CGR array 120 to implement the user algorithms and functions in the dataflow graph. Likewise, an argument load file 168 can provide arguments for any level and provide all or a subset of the arguments for individual CGR units.

In some cases, the runtime program 170 may copy the configuration file 165 and/or the argument load file 168, stored in the memory of the host 180, to the memory 190 coupled to the CGR processor 110 to create a configuration file copy 165A and/or an argument load file copy 168A. This may be done to provide better access to the configuration file copy 165A and/or the argument load file copy 168A from the CGR array 120 and avoid impact to the bandwidth of the system data link 185 and or the memory of the host 180 during runtime.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
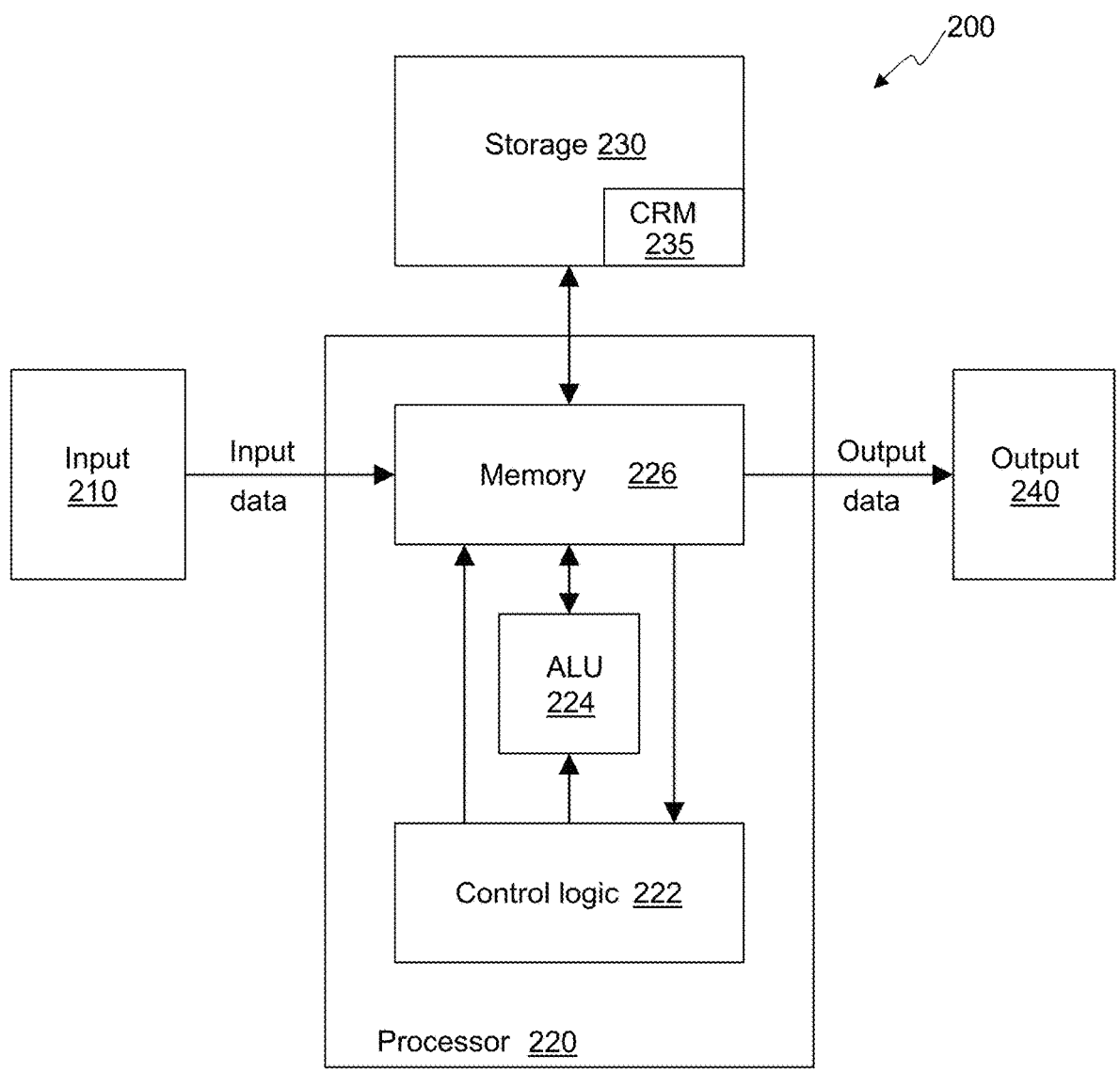
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
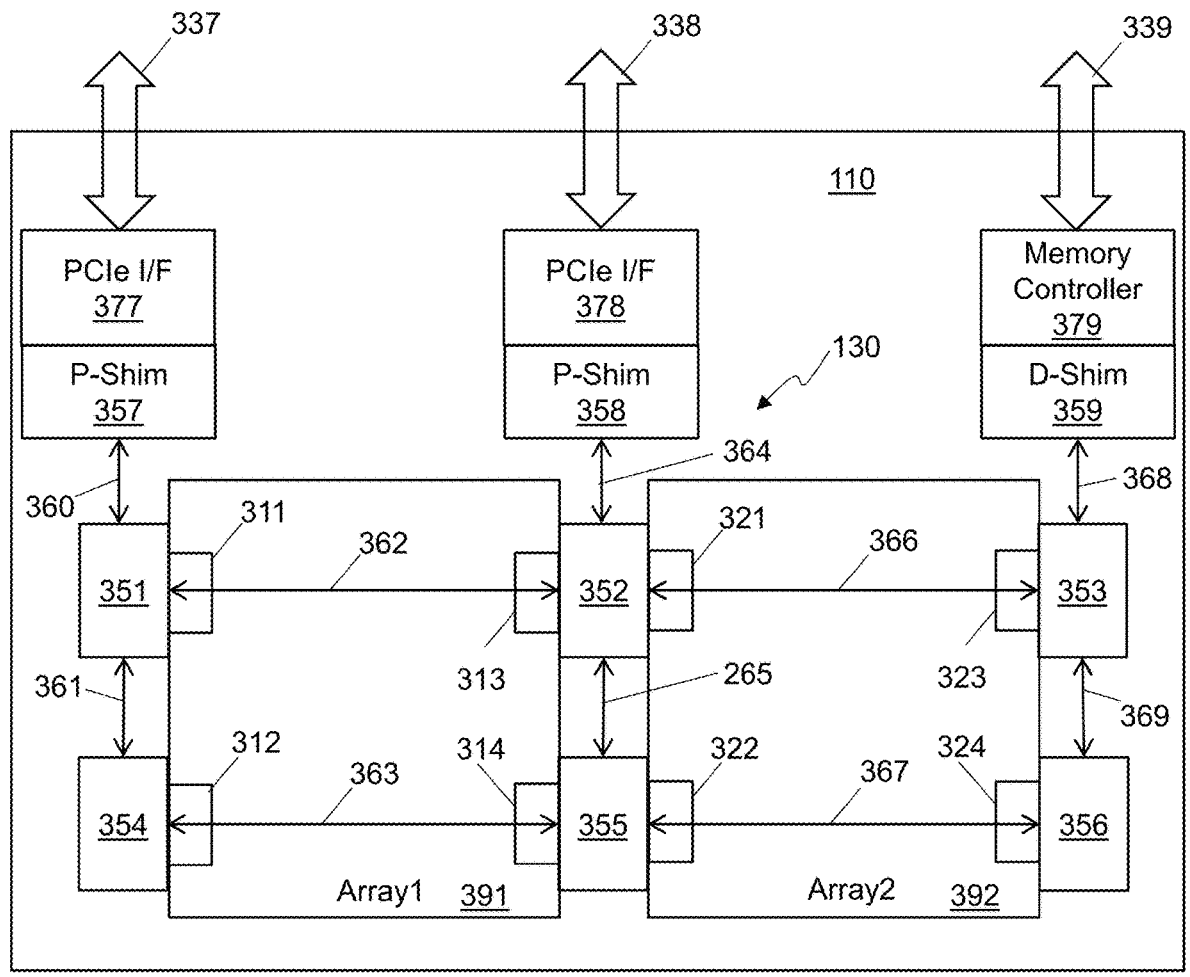
FIG. 3 illustrates example details of a CGR architecture including a top-level network (TLN) and two CGR arrays.

FIG. 3 is a simplified block diagram of the example CGR processor 110 having a CGRA (Coarse-Grained Reconfigurable Architecture). In this example, the CGR processor 110 has 2 CGR arrays (Array1 391, Array2 392), although other implementations can have any number of arrays, including a single array. A CGR array 391, 392 (which is shown in more detail in FIG. 4) comprises an array of configurable units connected by an array-level network (which also may be called a bus system) in this example. Each of the CGR arrays 391, 392 has one or more AGCUs (Address Generation and Coalescing Units) 311-314, 321-324. The AGCUs are nodes on both a top-level network (which also may be called an internal network) 130 and on array-level networks within their respective CGR array 391, 392 and include resources for routing data among nodes on the top-level network 130 and nodes on the array-level network in each CGR array 391, 392.

The CGR arrays 391, 392 are coupled to a top-level network (TLN) 130 that includes switches 351-356 and links 360-369 that allow for communication between elements of Array1 391, elements of Array2 392, and shims to other functions of the CGR processor 110 including P-Shims 357, 358 and M-Shim 359. Other functions of the CGR processor 110 may connect to the TLN 130 in different implementations, such as additional shims to additional and/or different input/output (I/O) interfaces and memory controllers, and other chip logic such as CSRs, configuration controllers, or other functions. Data travels in packets between the devices (including switches 351-356) on the links 360-369 of the TLN 130. For example, top level switches 351 and 352 are connected by a link 362, top level switches 351 and P-Shim 357 are connected by a link 360, top level switches 351 and 354 are connected by a link 361, and top-level switch 353 and D-Shim 359 are connected by a link 368.

The TLN 130 is a packet-switched mesh network using an array of switches 351-356 for communication between agents. Any routing strategy can be used on the TLN 130, depending on the implementation, but some implementations may arrange the various components of the TLN 130 in a grid and use a row, column addressing scheme for the various components. Such implementations may then route a packet first vertically to the designated row, and then horizontally to the designated destination. Other implementations may use other network topologies and/or routing strategies for the TLN 130.

P-Shims 357, 358 provide an interface between the TLN 130 and PCIe Interfaces 377, 378 which connect to external communication links 337, 338 which may form part of communication links 185 as shown in FIG. 1. While two P-Shims 357, 358 with PCIe interfaces 377, 378 and associated PCIe links 337, 338 are shown, implementations can have any number of P-Shims and associated PCIe interfaces and links. A D-Shim 359 provides an interface to a memory controller 379 which has a DDR interface 339 and can connect to memory such as the memory 190 of FIG. 1. While only one D-Shim 359 is shown, implementations can have any number of D-Shims and associated memory controllers and memory interfaces. Different implementations may include memory controllers for other types of memory, such as a flash memory controller and/or a high-bandwidth memory (HBM) controller. The interfaces 357-359 include resources for routing data among nodes on the top-level network (TLN) 130 and external devices, such as high-capacity memory, host processors, other CGRA processors, FPGA devices and so on, that are connected to the interfaces 357-359.

As explained earlier, in the system shown in FIG. 1, each CGR processor can include an array of CGR units disposed in a configurable interconnect (array level network or bus system), and the configuration file defines a data flow graph including functions in the configurable units and links between the functions in the configurable interconnect. In this manner the configurable units act as sources or sinks of data used by other configurable units providing functional nodes of the graph. Such systems can use external data processing resources not implemented using the configurable array and interconnect, including memory and a processor executing a runtime program, as sources or sinks of data used in the graph.

One of the AGCUs in each CGR array in this example is configured to be a master AGCU (MAGCU), which can include several different controllers for the array, such as, but not limited to, a program load controller, a fast argument load controller, an alternative argument load controller, and a quiesce controller. The MAGCU1 311 includes the controllers for CGR array 391, and MAGCU2 321 includes the controllers for CGR array 392. Some implementations may include other controllers for other functions. In other implementations, a controller may be implemented by logic distributed among more than one AGCU. In yet other implementations, a controller can be designed to perform its function for more than one CGR array. In further implementations, more than one controller for a single function may be provided for a single CGR array. Also, the controllers can be implemented in other portions of the system, including as a stand-alone circuit on the TLN and/or the ALN or ALNs.

Figure 4:
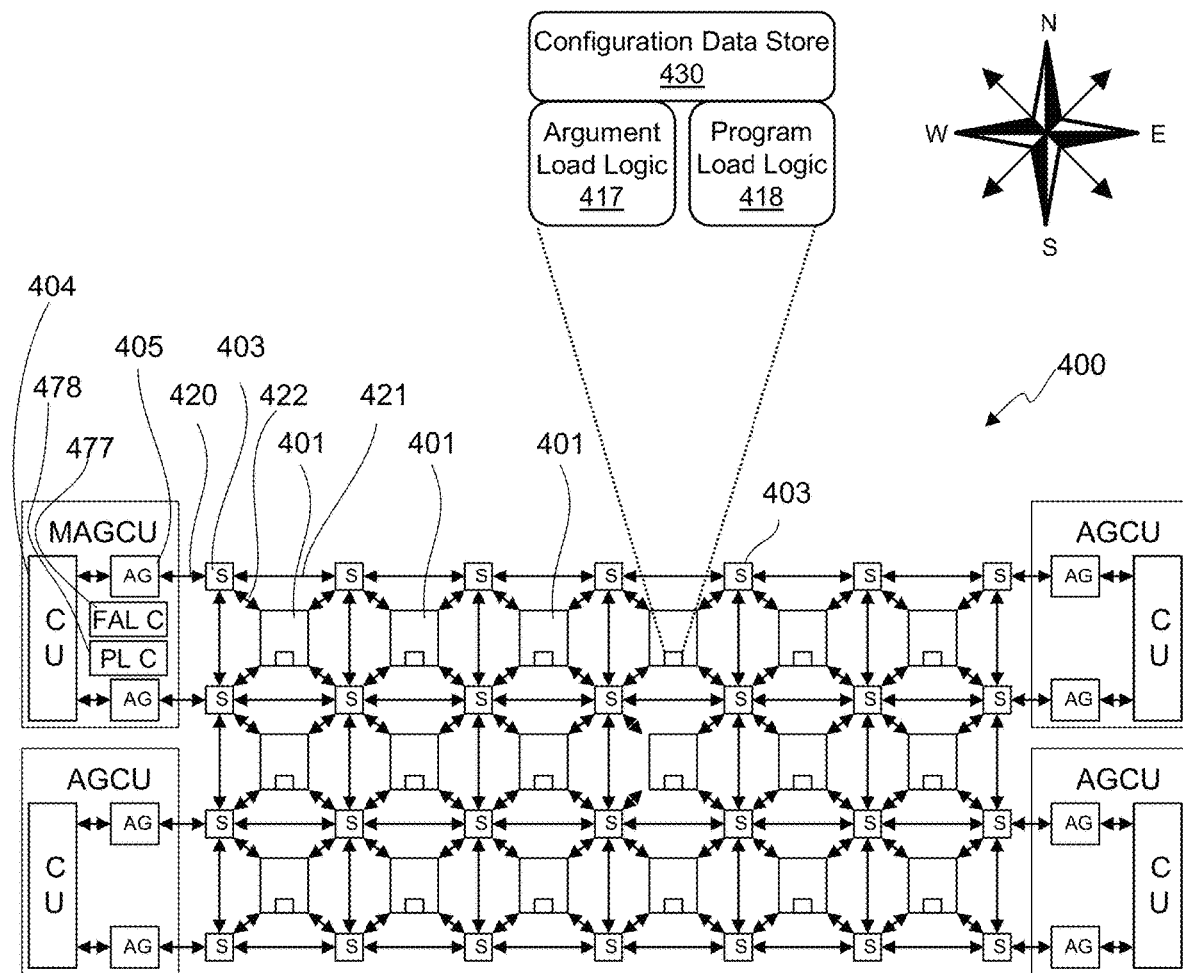
FIG. 4 illustrates an example CGR array, including an array of CGR units in an array-level network (ALN).

FIG. 4 illustrates an example CGR array 400, including an array of CGR units in an ALN. CGR array 400 may include several types of CGR units 401, such as FCMUs, PMUs, PCUs, memory units, and/or compute units. For examples of the functions of these types of CGR units 401, see Prabhakar et al., as listed earlier. Each of the CGR units 401 may include a configuration data store 430 comprising a set of registers or flip-flops storing configuration data that represents the setup and/or the sequence to run a program and arguments for use in the program. The configuration data can include the number of nested loops, the limits of each loop iterator, the instructions to be executed for each stage, the source of operands, and the network parameters for the input and output interfaces, among many other things. In some implementations, each CGR unit 401 comprises an FCMU. In other implementations, the CGR array 400 comprises both PMUs and PCUs, or memory units and compute units, arranged in a checkerboard pattern. In yet other implementations, CGR units 401 may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels are established as and when needed. So, configurable units in the array of configurable units can include a plurality of address generation and coalescing units (AGCUs), including a master AGCU (MAGCU) and one or more slave AGCUs, and the master AGCU may include the interface unit. The configurable units in the array of configurable units, in addition to the MAGCU and one or more slave AGCUs, can include pattern memory units (PMUs), pattern compute units (PCUs), and switches. Each switch can have eight ports useable to connect to four neighboring configurable units and to neighboring switches in each of four directions. The configurable units in the array of configurable units may be arranged in two dimensions, M×N, and communicate over the bus system that includes an (M+1)×(N+1) switch fabric.

A configuration file includes configuration data representing an initial configuration, or starting state, of each of the CGR units 401 that execute a high-level program with user algorithms and functions. Program load is the process of setting up the configuration data stores in the CGR array 400 based on the configuration data to allow the CGR units 401 to execute the high-level program. Program load may also require loading memory units and/or PMUs. A CGR array 400 includes a program load controller 478 which may be included in the MAGCU (i.e., an interface unit). It may also include a program load address register writeable by the runtime program running on the host processor to indicate a starting physical memory address of the configuration file to be used by the program load controller, and a program control register with one or more program load bits. The program load controller 478 may recognize a program load command in response to a write to at least one of the program load address register or the one or more program load bits of the program control register by the runtime program running on the host processor. The program load controller 478 responds to the program load command by reading sub-files of the configuration data for CGR units 401 in the array from memory and communicating with program load logic 418 of the CGR units 401 to send configuration data to the configuration data store 430. This may include broadcasting a program load signal to configurable units of the array of configurable units to transition the configurable units into a state of awaiting configuration sub-files, generating memory access requests to a memory starting at an address stored in the program load address register, receiving the sub-files of the configuration data from the memory, and distributing the sub-files of the configuration data to the configurable units. The program load logic 418 sends sub-files from the configuration file to a particular CGR unit identified for those sub-files to fully load the configuration data store 430 of that particular CGR unit.

The CGR array 400 also includes a fast argument load (FAL) controller 477 which also may be included in the MAGCU. An argument load address register in the interface unit (e.g., MAGCU) is writeable by the runtime program running on the host processor to indicate a starting physical memory address of the argument load file to be used by the FAL controller 477. An argument load size register in the interface unit (e.g., MAGCU) is writeable by the runtime program running on the host processor to indicate a file size of the argument load file to be used by the FAL controller 477. The interface unit may also include a program control register with the FAL controller 477 configured to recognize an FAL command in response to a write to at least one of the argument load address register, the argument load size register, or one or more argument load bits of the program control register by the runtime program running on the host processor. After the FAL controller 477 receives an FAL command from the runtime program, it reads a block of data from the argument load file stored in memory and sends (value, control) tuples, one tuple a time, to CGR units 401 identified by the control element of the tuple.

The ALN or bus system of the CGR array, includes one or more kinds of physical data buses, for example a chunk-level vector network (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a data transfer when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest, and Southwest interfaces of a switch unit 403 may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array 400 after configuration, data can be sent via one or more switch units and one or more links between the switch units to the CGR units 401 using the vector bus and vector interface(s) of the one or more switch units on the ALN. A CGR array 400 may comprise at least a part of CGR array 400, and any number of other CGR arrays coupled with CGR array 400.

A data processing operation implemented by a CGR array configuration may comprise multiple graphs or subgraphs specifying data processing operations that are distributed among and executed by corresponding CGR units (e.g., FCMUs, PMUs, PCUs, AGs, and CUs).

Figure 5:
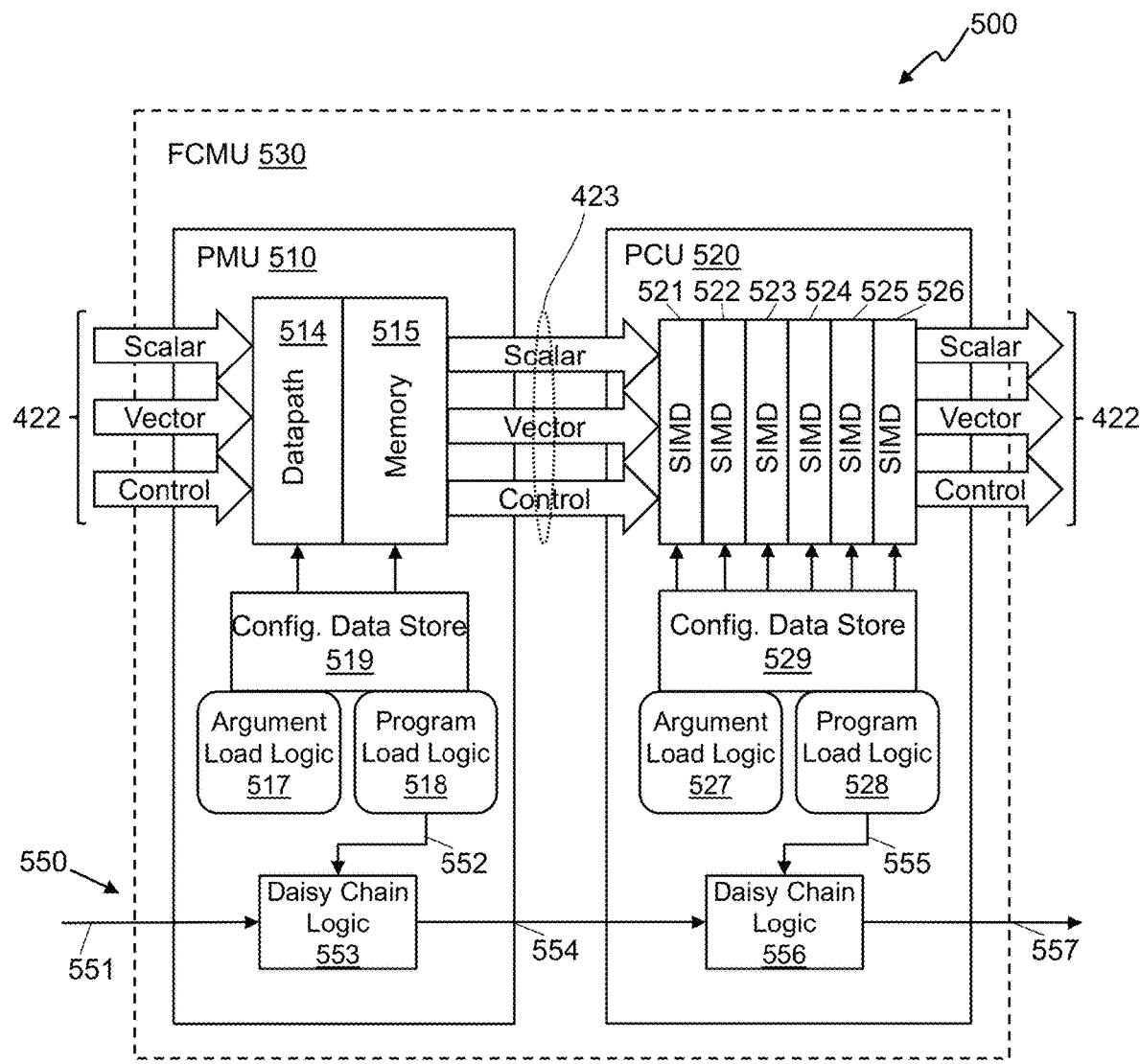
FIG. 5 illustrates an example of a pattern memory unit (PMU) and a pattern compute unit (PCU), which may be combined in a fused compute and memory unit (FCMU).

FIG. 5 illustrates an example 500 of a PMU 510 and a PCU 520, which may be combined in an FCMU 530. PMU 510 may be directly coupled to PCU 520 through one or more links 423 of the ALN, or optionally via one or more switches. PMU 510 includes a scratchpad memory 515 coupled to a data path 514 to provide memory addresses, data, and memory control information (write enable, read enable). The data path 514 receives information via one or more links 422 included in the ALN. The links 422, 423 are a part of a bus system (also referred to as the array level network—ALN) that includes three physical networks:
  a packet-switched vector network that transfers vector packets each having a multi-word-sized vector payload and a header that includes a destination, a sequence ID, and a virtual channel (flow control class).
  a packet-switched scalar network that transfers scalar packets each having a word-sized payload and a header that includes information such as a destination and a type.
  a circuit-switched control network that uses wires that are pulsed to transmit a control token.
The vector network can carry (value, control) tuples from the FAL controller to the configurable units in the array of configurable units, and the scalar network can carry response packets from the configurable units in the array of configurable units to the FAL controller.

The PMU 510 includes a configuration data store 519 to hold configuration data to configure the data path 514 and the memory 515. The configuration data also includes arguments that are used by a portion of the dataflow graph running on the PMU 510 and/or are used to manage the execution of the dataflow graph.

The PMU 510, like other CGR units in the CGR array of the CGR processor, includes program load logic 518 and argument load logic 517 that can store data into the configuration data store 519. The program load logic 518 and the argument load logic 517 are described in more detail later in this disclosure. The program load logic 518 can provide a "done" signal 552 to the daisy chain logic 533 upon completion of loading the configuration data store 519.

PCU 520 includes two or more processor stages, such as SIMD 521 through SIMD 526, and configuration data store 529. The processor stages 521-526 may include ALUs, or SIMDs, as drawn, or any other reconfigurable stages that can process data. Each stage in PCU 520 may also hold one or more registers (not drawn) for short-term storage of parameters. Short-term storage, for example during one to several clock cycles or unit delays, allows for synchronization of data in the PCU pipeline. The output of the processor stages 521-526 can be sent out of the PCU 520 through one or more links 422 of the ALN. The PCU 520 includes a configuration data store 529 to hold configuration data to configure the processor stages 521-526. The configuration data also includes arguments that are used by a portion of the dataflow graph running on the PCU 520 and/or are used to manage the execution of the dataflow graph.

The PCU 520 includes program load logic 528 and argument load logic 527 that can store data into the configuration data store 529. The program load logic 528 and the argument load logic 527 are described in more detail later in this disclosure. The program load logic 528 can provide a "done" signal 555 to the daisy chain logic 556 upon completion of loading the configuration data store 529.

The daisy chain 550 of the CGR array provides an interconnect topology, separate from and in addition to, the bus system of the CGR array (i.e. the ALN), that connects to the configurable units (i.e. the CGR units) in the array of configurable units. This interconnect topology includes the daisy chain 550 which can be used by the configurable units in the array to indicate completion of at least a portion of loading the configuration data or loading the received argument data into their respective configuration data store. In some implementations the argument load logic 517, 527 may also provide a done signal to its respective daisy-chain logic 553, 556. The daisy chain 550 connects the configurable units in an array of configurable units together with the output of one unit feeding into the input of a next unit. For example, the first daisy chain signal 551 comes from another configurable unit (not shown) and drives an input of the daisy chain logic 553. The daisy chain logic 553 will keep its output 554 inactive until both its input 551 and the done signal from the program load logic 518 are active, but once that is true, it will drive its output 554 active. The daisy chain logic 553 may include a clocked flip-flop to make the daisy chain 550 into a clocked pipeline. The output 554 of the daisy chain logic 553 leaves the PMU 510 and enters the PCU 520 where it becomes the input of daisy chain logic 556. Daisy chain logic 556 holds its output 557 inactive until both its input 554 and done signal 555 are active. The output 557 leaves the PCU 520 and goes to another configurable unit. In some implementations, all of the configurable units in an array are connected into the daisy chain 550. The daisy chain 550 may begin and end at a controller, such as the MAGCU for the array.

Figure 6:
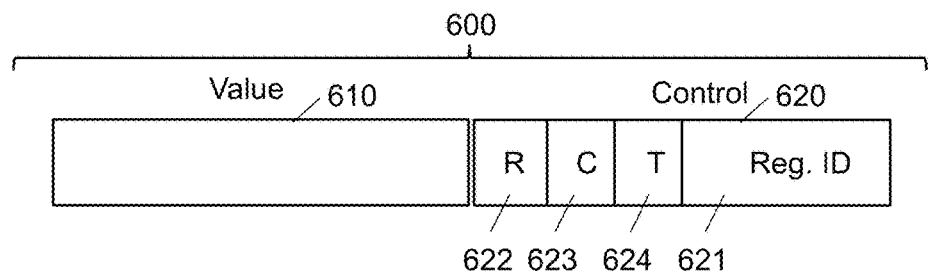
FIG. 6 shows an example (value, control) tuple to specify data to be loaded into a particular argument register in the CGR processor.

FIG. 6 shows an example (value, control) tuple 600 to specify data to be loaded into a particular argument register in the CGR processor. The (value, control) tuple 600 includes a value portion 610 and a control portion 620 which can be of the same size in some implementations and may be 32 bits each in at least one implementation. Other implementations can have any sized value portion 610 and any sized control portion 620. The value portion 610 contains a value to be written into a particular argument register of a particular configurable unit. The control portion 620 identifies the particular argument register of the particular configurable unit to be written with the value of the value portion 610. In at least one implementation, the control portion 620 includes several separate fields. The control portion 620 may include a row number 622 and column number 623 of the particular configurable unit within the array. The control portion 620 may also include a type 624 of the particular configurable unit. The control portion 620 also can include a register ID 621 to identify the particular register within the particular configurable unit. Other organizations of the control portion 620 are envisioned, such as a simple serial number of the register within the entire array or a simple serial number of the configurable unit and a register number for the register within that configurable unit. So, a (value, control) tuple 600 can include a value word 610 of data to be written to an argument register and a control word 620 of data indicating a location of an argument register of the argument registers to be written. The control word 620 of data can include an ID 621 of the argument register to be written and a destination identification 622-624 of the configurable unit containing the argument register to be written. The destination identification in some implementations identifies a row 622 in the array of configurable units containing the configurable unit, a column 623 in the array of configurable units containing the configurable unit, and a type 624 of the configurable unit. In at least one implementation, the type can identify a memory unit, a compute unit, a switch, or an interface unit, among other types of units.

Figure 7:
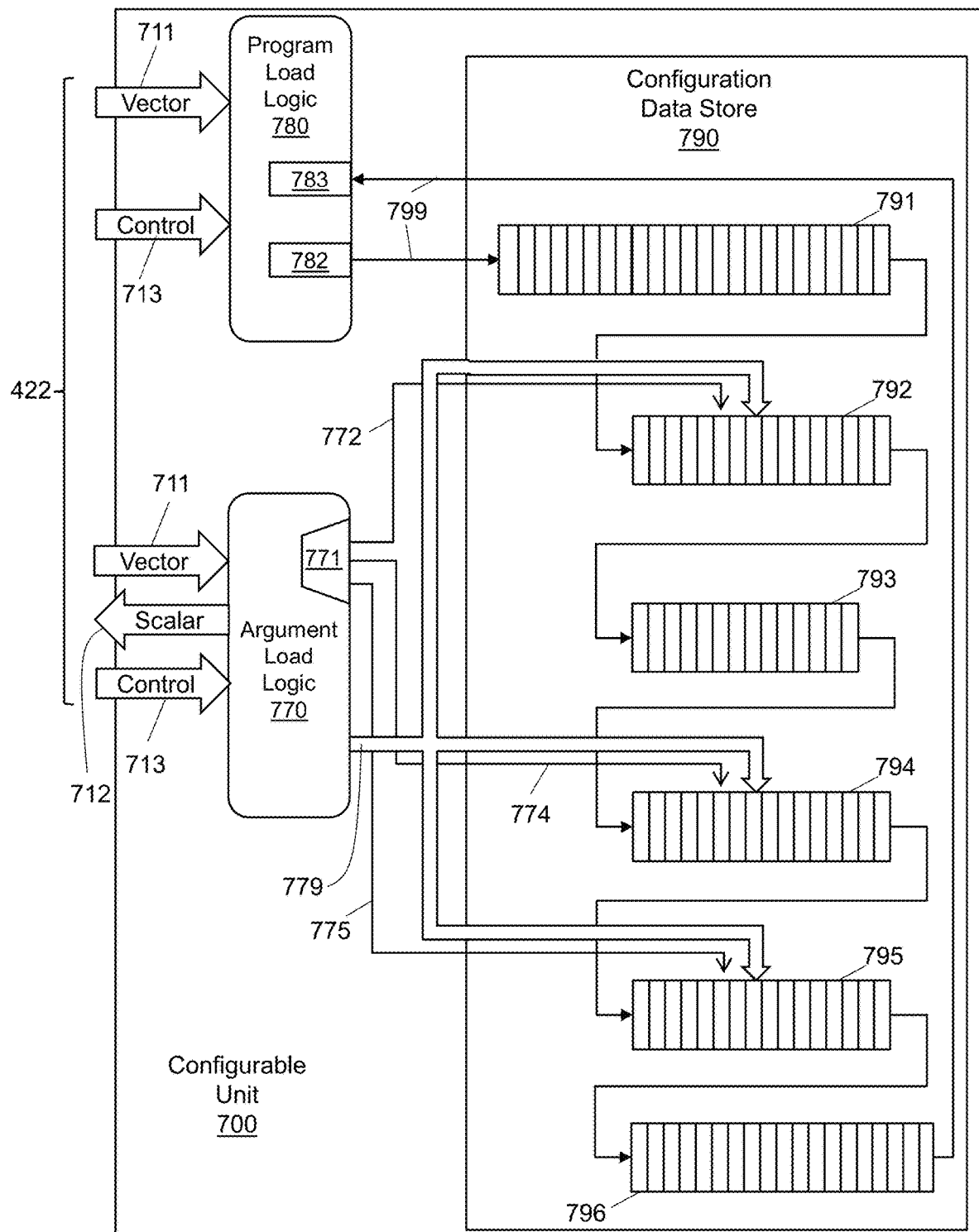
FIG. 7 illustrates an example of a configuration data store organized as a shift register with program load logic to shift configuration data into the shift register of the configuration data store and argument load logic to directly load data into argument registers within the shift register.

FIG. 7 illustrates an example of a configuration data store 790 of a configurable unit 700 in an array of configurable units in a reconfigurable processor organized as a shift register to store configuration data. The configuration data store 790 also includes individually addressable argument registers 792, 794, 795 respectively including word-sized portions of the shift register adapted to provide arguments to the configurable unit 700. The configurable unit 700 includes program load logic 780 to receive sub-files of the configuration data via links 422 of the bus system (e.g., the ALN) and to load the received sub-files into the configuration data store 790, including the argument registers, by sequentially shifting the received sub-files into the shift register. The configurable unit 700 also includes argument load logic 770 to receive argument data via links 422 of the bus system and load the received argument data into the argument registers 792, 794, 795 without shifting the received argument data through the shift register. Note that the shift register may include configuration bits 791, 793, 796 that are not defined as argument registers or accessible through the fast argument load process.

A program load controller associated with the array responds to a program load command by executing a program load process. This may include sending a first signal to the program load logic 780 of the configurable unit 700 over the control network 713, and subsequently distributing a configuration file that has sub-files of configuration data to the configurable unit 700 in the array as specified in the configuration file. The sub-files may be sent to the program load logic 780 over the vector network one sub-file at a time. The program load logic 780 loads the received sub-file into an input register 782 and then shifts the data of the input register 782 into the shift register of the configuration data store 790 through the shift chain 799. As the input register 782 is shifted into the first section 791 of the shift register, the data from the first section 791 shifts into the first argument register 792 (which is also the second section of the shift register), the data from the first argument register 792 shifts into the third section of the shift register 793, the data from the third section of the shift register 793 shifts into the second argument register 794 (which is also the fourth section of the shift register), the data from the second argument register 794 shifts into the third argument register 795 (which is also the fifth section of the shift register), the data from the third argument register 795 shifts into the sixth section of the shift register, and the data from the sixth section of the shift register shifts into the output register 783 of the program load logic 780. As each new sub-file is received, the process of shifting it from the input register 782 into the shift register is repeated. Note that to update even a single bit of the configuration data store using the program load process, the entire contents of the configuration data store 790 need to be shifted into the shift register of the configuration data store 790. Note that depending on the implementation, the width of the shift chain 799 can be any number of bits, including, but not limited to, 1 bit wide (a true serial shift register), 2 bits wide, and 4 bits wide. Thus, the shift register can include a multi-bit wide shift chain 799 that includes the individually addressable argument registers 792, 794, 795.

A fast argument load (FAL) controller associated with the array responds to an FAL command by executing an FAL process. This may include sending a second signal to the argument load logic 770 of the configurable unit 700 over the control network 713, and subsequently distributing (value, control) tuples to the configurable unit 700 over the vector network 711 as specified in an argument load file. The (value, control) tuple may be sent to the configurable unit 700 over a vector network 711 of the bus system using dimension order routing. The argument load logic 770 uses the register ID part of the control portion of the (value, control) tuple to determine which argument register 792, 794, 795 to access. In the example provided, the register ID can be provided to the demultiplexer 771 to drive the appropriate write enable signal 772, 774, 775 while the value portion of the (value, control) tuple is provided on the argument data bus 779. So, if the register ID is 1 (Note: when counting IDs in this example, the counting starts at 1), argument register write enable1 772 is asserted to directly write the value portion of the (value, control) tuple into the first argument register 792 in parallel without shifting the value portion through the shift register. That is to say that a new value is stored in the first argument register 792 without changing the data in another part of the shift register, such as the first section 791 of the shift register immediately preceding the first argument register 792 or the third section 793 of the shift register immediately following the first argument register 792. Similarly if the register ID is 2, argument register write enable2 774 is asserted to directly write the value portion of the (value, control) tuple into the second argument register 794 in parallel without shifting the value portion through the shift register, and if the register ID is 3, argument register write enable3 775 is asserted to directly write the value portion of the (value, control) tuple into the third argument register 795 in parallel without shifting the value portion through the shift register. Once the (value, control) tuple has been processed by writing the value portion to the argument register specified by the control portion, the argument load logic 770 sends a response packet with its control bit set over the scalar network 712 to the FAL controller to indicate that a (value, control) tuple has been processed. Thus, the configurable unit 700 is configured to provide multiple access modes to an argument register of the individually addressable argument registers 792, 794, 795. The multiple access modes may include a first access mode of sequentially shifting argument data into the argument register via the multi-bit wide shift chain 799, and a second access mode of accessing the argument register directly without changing data loaded into other parts of the shift register.

Figure 8:
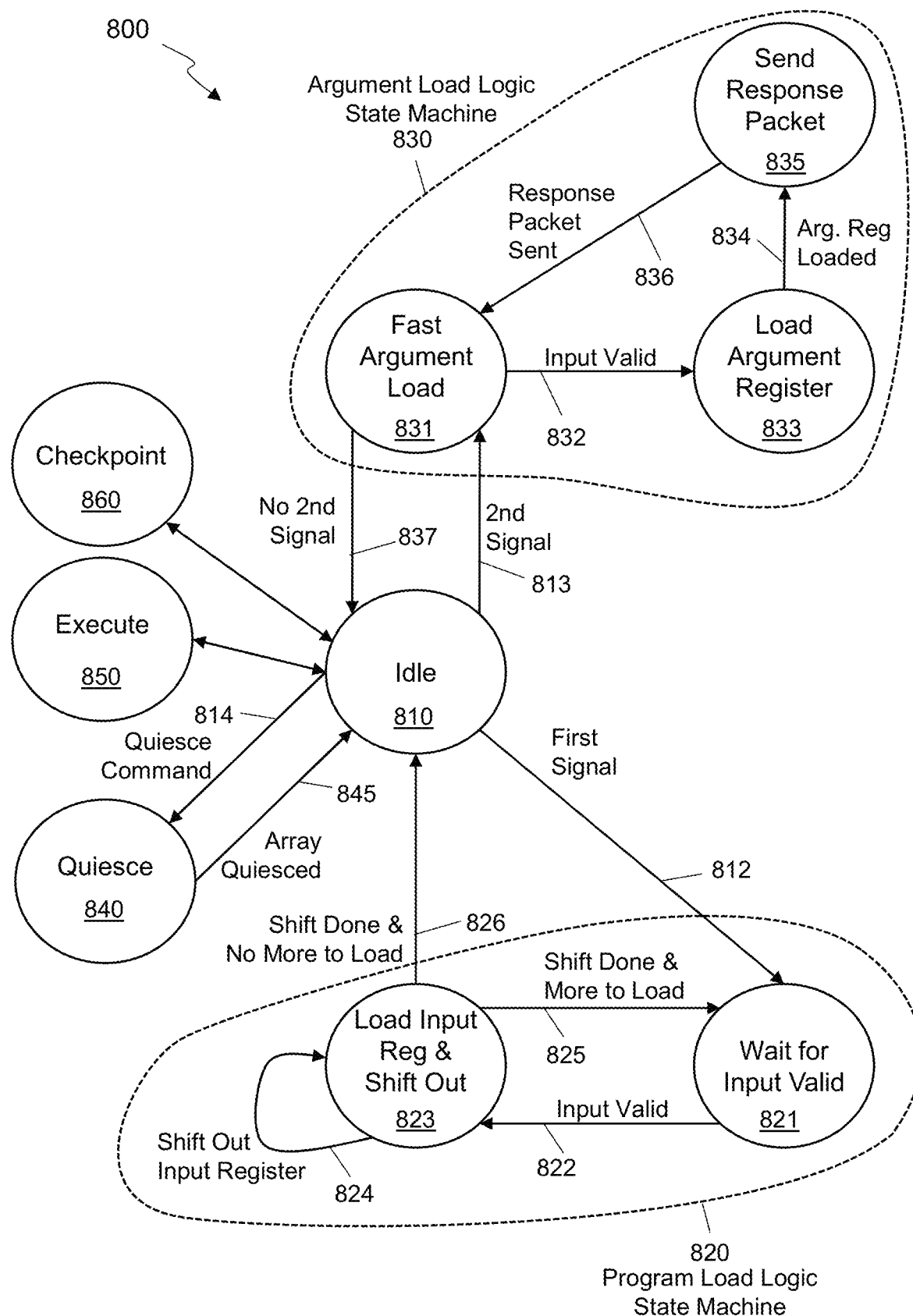
FIG. 8 shows a state diagram for an example CGR unit.

FIG. 8 shows a state diagram 800 for the example CGR unit 700. Other CGR units such as the PMU 510 or the PCU 520 could have a similar state diagram. The CGR unit 700 can transition from Idle State 810 to any of at least five states in response to and controlled by control signals received from a master AGCU (MAGCU) with which the CGR unit 700 is associated. The CGR unit 700 responds to first signal 812 (which may be a pr-program-load signal in some implementations) by transitioning from Idle State 810 to State 821 of program load logic state machine 820. The CGR unit 700 responds to second signal 813 (which may be a pr-argument-load signal in some implementations) by transitioning from Idle State 810 to fast argument load (FAL) State 831 of argument load logic state machine 830. Though not further discussed here, the CGR unit 700 also responds to control signals received from MAGCU to transition to quiesce State 840, execute State 850, and checkpoint state 860. In some implementations, the argument load logic in the configurable unit 700 is configured to cause a component state machine 800 in the configurable unit 700 to transition from a current state to a fast argument load state 831 in response to receiving the second signal, wherein the current state of the configurable unit 700 is one of idle 810, program load waiting 821, program load 823, quiesce 840, execute 850, or checkpoint 860.

The program load logic 820 comes in to play to control the CGR unit's 700 participation in the program load process. Upon entering State 821, the CGR unit 700 begins to await receipt of valid input data. Subsequently, chunk-wide (e.g., 512 bits of data) sub-files of configuration data arrive via the vector network 711, in response to which the CGR unit 700 transitions from State 821 via arc 822 to State 823 and begins to sequentially shift the received data from the input register 782 into the first section 791 of the shift register of the configuration data store 790. The CGR unit 700 will continue to shift data out of the input register 782 by repeatedly performing the shift out action of arc 824. When the shifting of data out of the input register 782 is done, if more data is needed to fully load the configuration data store 790, the CGR unit 700 returns to State 821 to await valid input data and again transitions via arc 822 to State 823 once another sub-file has been received, and again shifts bits of the input register 782 into the first section 791 of the shift register. The CGR unit 700 continues to transition between State 821 and State 823 and shift data out of the input register 782 via arc 824 for as long as it takes to fill the configuration data store 790. At State 823, if the shifting is done and no more input data needs to be loaded, the CGR unit transitions back to Idle State 810 via arc 826.

In some implementations, not shown, upon completion of the program load process, the CGR unit 700 will transition from state 823 to EXEC State 850 rather than to Idle State 810. Whether the CGR unit 700 goes to Idle State 810 or to EXEC State 850 after completion of the program load process depends on which bit 901, 902 of the program control register 900 (See FIG. 9) was set to trigger the program load process.

Alternatively, the argument load logic 830 comes in to play to control the CGR unit 700 during its participation in the argument load process. At State 831, in response to detecting receipt of a valid (value, control) tuple 600, the CGR unit 700 transitions via arc 832 to State 833, during which the CGR unit 700 will write a value 610 included in the (value, control) tuple 600 to an argument register of the individually addressable argument registers identified by a register identifier 621 included in the (value, control) tuple 600, such as one of the first argument register 792, the second argument register 794, or the third argument register 795. In some implementations, the tuple 600 contains a word-sized value element 610 and a word-sized control element 620 (as shown in FIG. 6). After loading the argument register, the CGR unit 700 then transitions from State 833 to State 835, where the CGR unit 700 will generate a response packet with a control bit set to 1 and send the response packet to the FAL controller via the scalar network. The CGR unit then transitions back to State 831 via arc 836, and, if the second signal is no longer set, transitions to Idle State 810. Note that the CGR unit 700 may remain in the FAL state machine 830 as long as the second signal is asserted and can continue to receive (value, control) tuples. That is to say the CGR unit 700 remains in the argument load state 830 until it receives a different command. The CGR unit 700 does not receive any indication of how many (value, control) tuples it will receive while in the argument load logic state machine 830, but simply processes the (value, control) tuples as they are received, sending a response packet for each tuple processed.

Note that the individually addressable argument registers 792, 794, 796 in the CGR unit 700 provide multiple access methods. Bits can be serially shifted into argument registers 792, 794, 796 contained in the shift register of the configuration data store 790, for example during arc 824 of the program load logic state machine 820, or they can be written to argument registers directly in parallel through the argument data bus 779, for example, when loading the argument register at State 833 of the argument load logic state machine 830.

It is expected that a program load process will be used to load the initial configuration into CGR units, and that the argument load process will be used later during runtime operation, to adjust a relatively small number of argument registers at a time.

The FAL controller (in the MAGCU) recognizes that a (value, control) tuple has been processed by receiving the response packet with the control bit set. During a single instantiation of the FAL process, an equal number of response packets should be received as the number of (value, control) tuples sent. This is true whether all of the (value, control) tuples in an argument load file are destined to a single CGR unit, or to a plurality of CGR units in the CGR array.

Though not described in detail here, the CGR unit 700 can respond to a quiesce command received from the MAGCU at arc 814 by transitioning to quiesce state 840 and then back to the idle state via arc 845 when appropriate. The quiesce state 840 is further described and illustrated in U.S. Nonprovisional patent application Ser. No. 17/322,697, filed May 17, 2021, entitled "QUIESCE RECONFIGURABLE DATA PROCESSOR."

The reconfigurable processor can include a plurality of arrays of configurable units with a quiesceable array being configurable to implement an execution fragment of a data processing operation. In some implementations, multiple arrays of the plurality of arrays are quiesceable. The configurable units in the quiesceable array include quiesce logic configurable to respond to a quiesce control signal from a quiesce controller of the array to quiesce the configurable unit on a quiesce boundary of the execution fragment. The quiesce controller can receive a quiesce command from the runtime program and respond by executing a quiesce process, including distributing the quiesce control signals to the configurable units in the quiesceable array, receiving quiesce ready signals from the respective configurable units, setting a quiesce ready bit of a tile status register, and generating an interrupt to the runtime program. The quiesceable array also includes the program load controller and the FAL controller to respectively perform the program load process and the FAL process on the quiesceable array when the quiesceable array is quiesced. The other arrays of the reconfigurable processor are configurable to continue operations irrespective of a state of the quiesceable array.

The runtime program may be configurable to allocate a plurality of sets of configurable units in the quiesceable array to implement respective execution fragments of the data processing operation. Quiesce logic in the configurable units may be configurable to define a plurality of quiesce boundaries in the execution fragments, and to quiesce the configurable units in the plurality of sets of configurable units on a common quiesce boundary in the plurality of quiesce boundaries and may include skew counters to track differences in progress of the execution fragment among the configurable units in the set of configurable units. In implementations, at least one configurable unit in each set of configurable units is configured as a producer of inputs, and at least one configurable unit in the set of configurable units is configured as a consumer of inputs, with the quiesce logic in each configurable unit configurable to stop the producer on the quiesce boundary.

Figure 9:
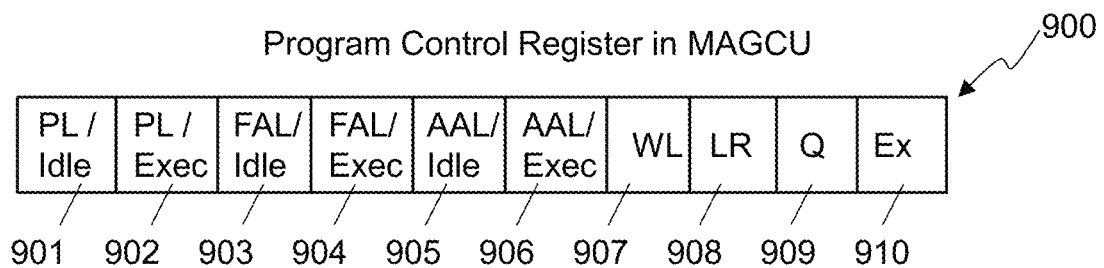
FIG. 9 illustrates an example program control register in an interface unit for a CGR array.

FIG. 9 illustrates an example program control register 900 in an interface unit for a CGR array. The program control register 900 can have any number of bits with any function, depending on the implementation. The example program control register 900 includes several example bits 901-910. Implementations may include any number or combination of the bits shown and/or may include additional bits.

The example program control register 900 includes two bits related to the program load function. A Program Load and Return to Idle (PL/Idle) bit 901, when set, can cause the program load controller to execute a program load process and once the program load process is complete, the configurable units return to an idle state. A Program Load and Execute (PL/Exec) bit 902, when set, can cause the program load controller to execute a program load process and once the program load process is complete, have the configurable units begin execution.

The example program control register 900 also includes two bits related to a fast argument load (FAL) function. AN FAL/Idle bit 903 can cause the FAL controller to execute an FAL process and once the FAL process is complete, the configurable units return to an idle state. AN FAL/Exec bit 904 can cause the FAL controller to execute an FAL process and once the FAL process is complete, the configurable units begin execution.

The example program control register 900 also includes two bits related to an alternative argument load (AAL) function. An AAL/Idle bit 905 can cause the FAL controller to execute an alternate argument load (AAL) process and once the AAL process is complete, the configurable units return to an idle state. An AAL/Exec bit 906 can cause the FAL controller to execute an AAL process and once the AAL process is complete, the configurable units begin execution.

The example program control register 900 also includes a cache_arg_writes_for_later (WL) bit 907 that, if set, causes the FAL controller to cache FAL commands received from the runtime program running on the host processor and execute the cached FAL commands at a later time. The example program control register 900 also includes a do_arg_load_even_if_running (LR) bit 908 that, if set, causes a configurable unit in the array of configurable units to accept and load an argument data value received in a (value, control) tuple even if the configurable unit is in an execute state. Also included in the example program control register 900 are a quiesce (Q) bit 909 and an execute (Ex) bit 910 which can be used to cause the configurable units to enter the quiesce state and the execute state, respectively.

In implementations, the interface unit may include the program load controller, the FAL controller, and a multi-bit program control register 900, selected bits of which are writeable by the runtime program running on the host processor to trigger execution of a process selected from among multiple processes, the multiple processes including the FAL process and the program load process. The interface unit, after completion of the selected process, may clear a bit of the program control register 900 that had been set by the runtime program running on the host processor to trigger execution of the selected process. Thus, the FAL controller may, upon completion of the FAL process, clear an FAL process bit 903, 902 of the program control register 900 that had been written to trigger execution of the FAL process. Similarly, the program load controller may, upon completion of the program load process, clear a program load bit 901, 902 of the program control register 900 that had been written to trigger execution of the program load process.

The FAL controller performs the FAL process without sending an indication of how many argument registers, M, will be loaded to the configurable unit before distributing the (value, control) tuples provided in an argument load file to the configurable unit, and the configurable unit accepts and processes (value, control) tuples received as long as it is in the argument load state. The argument load file used by the FAL process has a minimum size of zero and a maximum size equaling a maximum number of (value, control) tuples representable by a number of bits of the argument load size register.

In contrast, an alternate argument load (AAL) process uses an alternate argument load file that contains a first section specifying a respective number of argument registers, M, to be written in each configurable unit in the array of configurable units. The alternative argument load file also includes a second section listing (value, control) tuples for argument registers that need to be written during the alternate argument load process. A minimum size of the first section of the alternate argument load file is based on a total number of configurable units in the array of configurable units, and a minimum size of the second section is zero, if no argument registers need to be written during the alternate argument load process.

The FAL controller is configured to begin the AAL process by performing a first step consisting of writing the respective M from the first section of the alternate argument load file to a number of arguments register in each configurable unit of the array of configurable units to indicate how many (value, control) tuples each configurable unit should expect to receive during the AAL process, wherein the number of arguments register in each configurable unit of the array of configurable units is written even if the value is zero. A configurable unit in the array of configurable units is configurable to report completion of the AAL process to the FAL controller after the respective M (value, control) tuples have been received and processed by writing argument data to M argument registers. The completion of the AAL process is communicated to the FAL controller via an interconnect topology, such as the daisy chain 550 of FIG. 5, rather than via a scalar network of the reconfigurable processor. The alternate argument load process is useable to provide an alternate mechanism in case a scalar network of the reconfigurable processor is not operational to report completion of the argument register loads in the FAL process.

Figure 10:
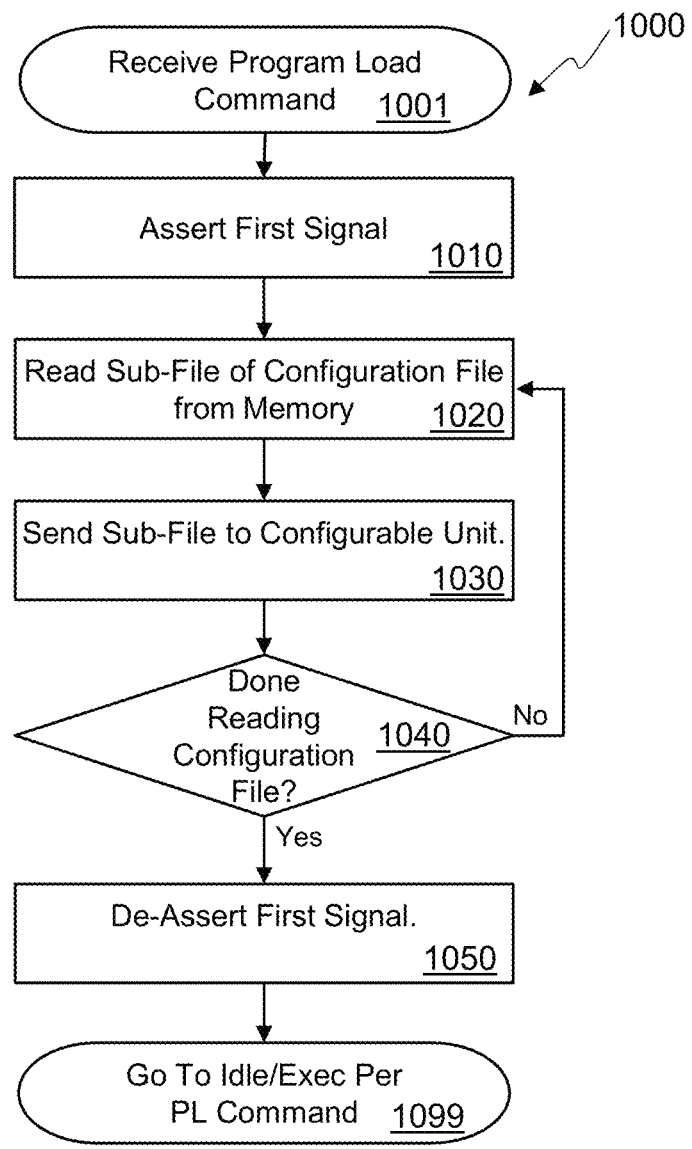
FIG. 10 is a flow chart for actions of an example program load controller.

FIG. 10 is a flow chart for actions of an example program load controller such as the program load controller 478 of FIG. 4. The flow illustrated in flow chart 1000 is meant to be performed by the program load controller contained in MAGCU. As shown, example flow chart 1000 begins at Step 1001, during which the program load controller receives a program load command from the runtime program. In particular, the runtime program issues the program load command by writing the starting physical address of the configuration file 165 to MAGCU's program load address register and then setting PL/Idle bit 901 or PL/Exec bit 902 of MAGCU's program control register 900 to trigger the program load process. Other implementations may recognize the program load command, by the program load controller, in response to a write to at least one of a program load address register or one or more program load bits 901, 902 of the program control register 900 by the runtime program, where the interface unit includes the program load controller, the program load address register, and the program control register 900.

At Step 1010, the program load controller asserts the first signal to the CGR units in the CGR array, to place the CGR units into a program load state to await receipt of configuration data. This may include broadcasting a program load signal (e.g., the pr-program-load signal) to configurable units in the array of configurable units to transition the configurable units into a state of awaiting sub-files of configuration data. At Step 1020, the program load controller uses the address stored in its program load address register to read a sub-file of configuration data from the configuration file. This may include generating memory access requests to a memory starting at an address stored in a program load address register and receiving configuration file data from the memory. If an error is generated during the memory read, an error bit of a tile status register may be set and an interrupt to the host processor generated in some implementations. After receiving the sub-file of configuration data from memory, the program load controller at Step 1030 sends the received sub-file to the configurable unit via the vector bus of the ALN, thus distributing sub-files of configuration data to configurable units in the array of configurable units as specified by the configuration file. At Step 1040, the program load controller checks whether it has read the entire configuration file from memory. If not, the program load controller returns to Step 1020 to read the next chunk of sub-files from the configuration file in memory. But, if reading the sub-files of configuration data is complete, the program load controller at Step 1050 de-asserts the first signal. Finally, at Step 1099, the program load process Is complete, and the program load controller causes MAGCU to return to the idle or execute state depending on whether PL/Idle bit 901 or PL/Exec bit 902 was set in the program control register 900 to send the program load command.

Thus, a method for operating a reconfigurable processor is shown by the flow chart 1000. The reconfigurable processor includes an array of configurable units connected by a bus system to a program load controller. Configurable units in the array of configurable units each include a configuration data store, organized as a shift register, to store configuration data. The configuration data store also includes individually addressable argument registers respectively comprising word-sized portions of the shift register adapted to provide arguments to the configurable unit. The method includes receiving at 1001 a program load command and responding by obtaining at 1020 a configuration file including sub-files of the configuration data, sending at 1010 a first signal from the program load controller to the configurable units, and distributing at 1030 the sub-files of configuration data to the configurable units. The configurable units receive the sub-files of the configuration data via the bus system at the configurable unit and load the received sub-files into the configuration data store, including the argument registers, by sequentially shifting data of the received sub-files into the shift register.

Figure 11:
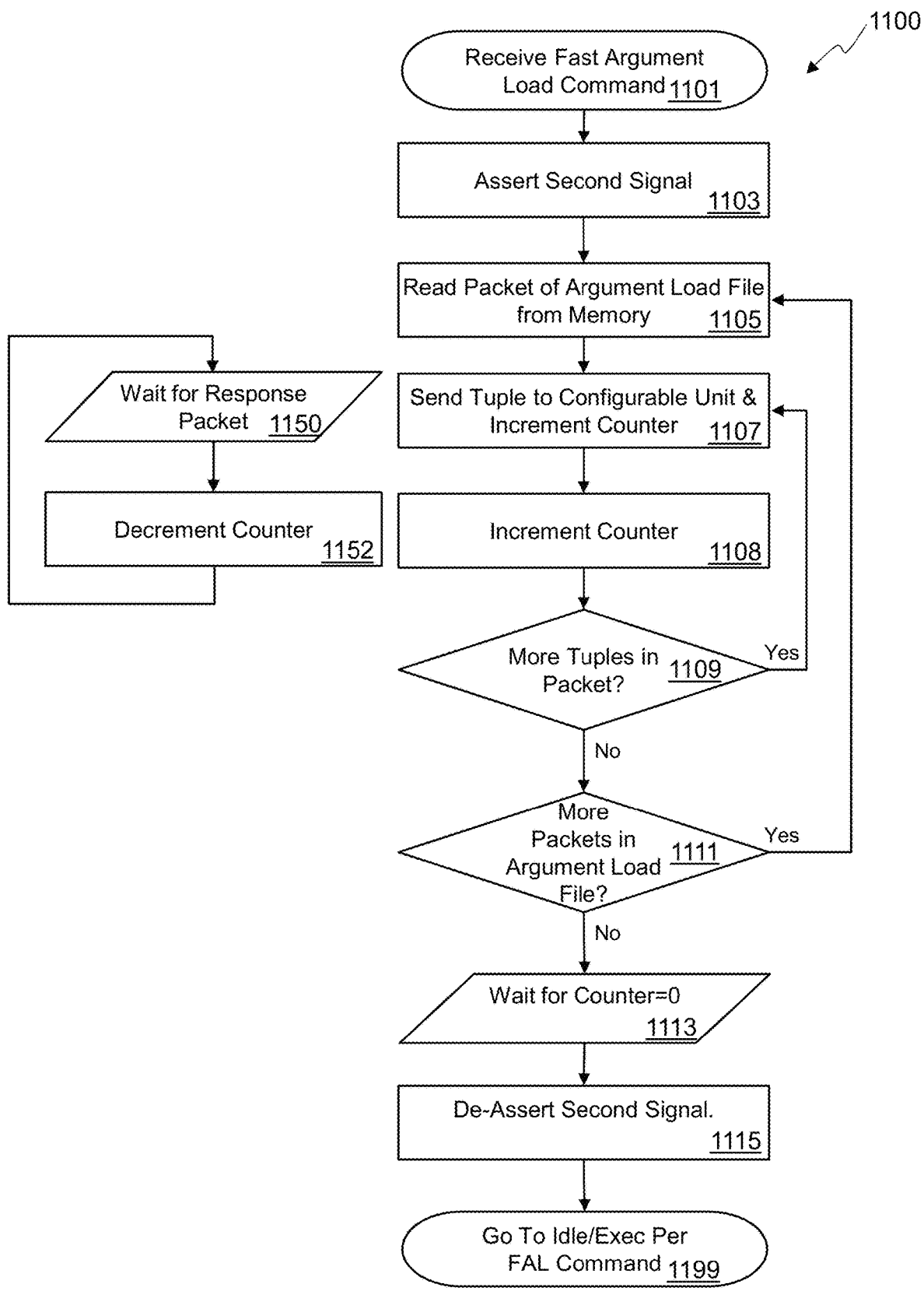
FIG. 11 is a flow chart for actions of an example fast argument load controller.

FIG. 11 is a flow chart for actions of an example fast argument load (FAL) controller such as the FAL controller 477 of FIG. 4. The example flow chart 1100 is meant to be performed by the fast argument load (FAL) controller contained in MAGCU. As shown, example flow chart 1100 begins at Step 1101, during which the FAL controller receives an FAL command from the runtime program. In particular, the runtime program issues the FAL command by writing the starting physical address of the argument load file 168 to MAGCU's argument load address register, writing the size of the argument load file to MAGCU's argument load size register, and writing the FAL/Idle bit 905 or the FAL/Exec bit 906 of MAGCU's program control register 900. Other implementations may recognize the FAL command, by the FAL controller, in response to a write to at least one of an argument load address register, an argument load size register, or an argument load bit of the one or more argument load bits 903, 904 of the multi-bit program control register 900, where the interface unit includes the FAL controller, the argument load address register, the argument load size register, and program control register 900.

At Step 1103, the FAL controller asserts the second signal to the CGR units in the CGR array, to place them into an argument load state to await receipt of (value, control) tuples of argument data via the vector bus of the ALN. This may include broadcasting an argument load signal (e.g., a pr-argument-load signal) to the configurable units in the array of configurable units in order to place the configurable units into the argument load state.

At Step 1105, the FAL controller uses the argument load file address stored in its argument load address register to read a packet of the argument load data from the argument load file 168. This may be done once the second signal has been received by all of the configurable units in the array of configurable units. This may be accomplished by issuing a memory access request to a physical address of the argument load file as stored in the argument load address register and receives data of the argument load file in response to the memory access request. The FAL controller sends the memory access request to a memory interface agent via the internal network and receives the first portion, or block of data, of the argument load file from the memory interface agent via the internal network. One block of data may be received in response to the memory access request, wherein the block of data may contain two or more (value, control) tuples. If an error occurs during the memory access, the FAL controller may transition the array to an IDLE state, abandoning execution of the FAL process, and set an error bit of a tile status register.

The argument load file includes argument load information with a list of (value, control) tuples to be processed during a single invocation of the FAL process. Each (value, control) tuple including a value word of data to be written to an argument register and a control word of data including an ID of the argument register to be written and a destination identification of a target configurable unit in the array of configurable units containing the argument register to be written. The destination identification identifies a row in the array of configurable units containing the target configurable unit, a column in the array of configurable units containing the target configurable unit, and a type of the target configurable unit. The type may be a memory unit, a compute unit, a switch, or an interface unit.

After receiving a block of data from argument load file, the FAL controller at Step 1107 sends a (value, control) tuple contained in the block to the CGR unit identified by the control element of the tuple via the vector bus. When the FAL controller sends the tuple, it also increments a counter at Step 1108. The FAL controller increments the counter in response to sending a (value, control) tuple to any configurable unit in the array of configurable units, At Step 1109, the FAL controller checks whether there are more tuples to send contained in the block of data. If so, the FAL controller returns to Step 1107 to send another (value, control) tuple to the CGR unit identified by the control element of the next tuple. In some implementations, the block of data read from the argument load file at Step 1105 will contain eight (8) double-words of data, i.e., eight (8) (value, control) tuples so that the FAL controller will perform the action of Step 1107 eight times for each block of data of the argument load file received. Thus, the (value, control) tuples of the first portion of the argument load file (i.e., a block of data), received in response to the memory access request, may be sent to the configurable units in the array of configurable units over a vector network of the bus system, one (value, control) tuple at a time. The (value, control) tuples can be distributed over the vector network to the configurable units of the array of configurable units using dimension-order routing, wherein a row dimension of the array of configurable units is traversed before a column dimension of the array of configurable units, to a row and column destination of the configurable unit specified in the respective (value, control) tuple.

A configurable unit, such as the configurable unit 700 of FIG. 7 or PMU 510 or PCU 520 of FIG. 5 transitions from a current state, such as idle, program load, checkpoint, execute, or quiesce, to an argument load state in response to the receiving the second signal. The configurable unit receives (value, control) tuples while in the argument load state. The configurable unit processes a (value, control) tuple by writing a value included in the (value, control) tuple directly to an argument register of the individually addressable argument registers identified by a register identifier included in the (value, control) tuple and sending a response packet over the scalar network with a set control bit to the FAL controller after completion of the writing. The response packets may be routed through the scalar network of the bus system using dimension-order routing.

The flow chart 1100 includes two threads of tasks that operate concurrently. The first thread includes Steps 1101-1115, and the second thread includes Steps 1150-1152. The second thread waits for a response packet at Step 1150, and whenever a response packet it received, it decrements the counter at Step 1152. The FAL controller is configured to decrement the count of (value, control) tuples sent with every scalar response packet with a control bit set received from configurable units over the scalar network. This is the same counter that is incremented in Step 1108. So, a current value of the counter shows a number of (value, control) tuples that have been sent to the configurable units of the array which have not yet been processed.

If the FAL controller determines at Step 1109 that no more tuples exist in the packet, the FAL controller at Step 1111 checks whether more packets remain to be read from the argument load file. This can be done by checking the amount of data of the argument load file read thus far and comparing that to the value written into the argument load size register which may specify the size of the argument load file in multiples of 64 bytes. If the argument load file has more data to read, the FAL controller returns to Step 1105 to read the next block from the argument load file. The FAL controller is configured to continue reading data from the argument load file one block of data at a time over the internal network until as many of the (value, control) tuples as are specified in the argument load size register have been read and distributed.

If the FAL controller determines at Step 1111 that no more packets remain to be read from the argument load file, the FAL process is complete and the FAL controller proceeds to Step 1113, to wait until the counter has reached zero (0). The counter is incremented at Step 1108 whenever a (value, control) tuple is sent, and decremented at Step 1152 whenever a response packet with its control bit set is received. So, when the counter is equal to zero, every (value, control) tuple that has been sent has been processed by a configurable unit.

When the counter reaches zero (0) the FAL controller proceeds to Step 1115 and de-asserts the second signal. The flow chart 1100 then proceeds to Step 1199, during which the FAL controller returns to the Idle state or the execute state, based upon which of the FAL/Idle bit 903 or FAL/Exec bit 904 in the program control register 900 was set to trigger the FAL command at Step 1101. In some implementations, not shown, the FAL controller remains in the argument load state at Step 1115, rather than to transition to the idle state or the execute state, unless it receives a new command from MAGCU. Thus, once all of the (value, control) tuples specified in the argument load file size register have been read from the argument load file, and once the count of unprocessed (value, control) tuples sent reaches zero, the FAL process is complete, and the FAL controller de-asserts the second signal, sets an argument load complete bit of a tile status register, and generates an interrupt. When executing the FAL process, the FAL controller is configured to perform the FAL process without indicating to the configurable units how many argument registers will be loaded during the FAL process, and the configurable units are configured to accept and process the (value, control) tuples received as long as they are in the argument load state.

Thus, a method for operating a reconfigurable processor is shown by the flow chart 1100. The reconfigurable processor includes an array of configurable units connected by a bus system to a fast argument load (FAL) controller. Configurable units in the array of configurable units each include a configuration data store, organized as a shift register, to store configuration data. The configuration data store also includes individually addressable argument registers respectively comprising word-sized portions of the shift register and adapted to provide arguments to the configurable unit. The method includes receiving at 1101 an FAL command and responding by executing an FAL process that includes sending 1103 a second signal from the FAL controller to the configurable units, obtaining 1105 argument load information including one or more argument values to be loaded into respective argument registers in the configurable units, and distributing 1107 the argument load information to the configurable units. The configurable units receive the argument load information via the bus system and load the one or more argument values into the one or more respective argument registers without shifting the one or more argument values through the shift register.

Figure 12:
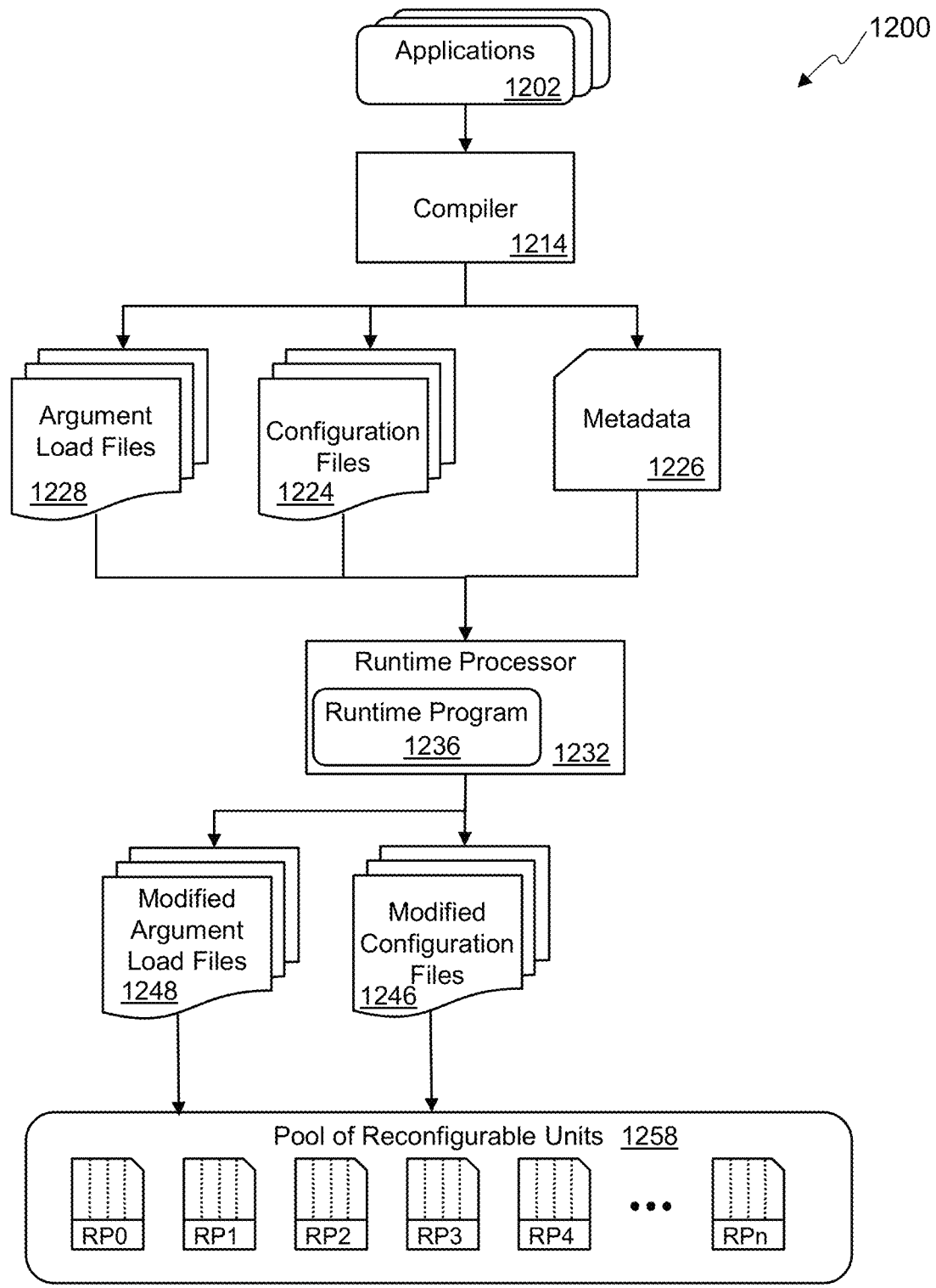
FIG. 12 shows an example of preparing configuration files and argument load files for loading into a CGR processor.

FIG. 12 shows an example of preparing configuration files and argument load files for loading into a CGR processor. Reconfigurable data flow resources in a pool of reconfigurable data flow resources 1258 include reconfigurable processors as shown in FIGS. 1-5. A reconfigurable processor includes an array of configurable units (e.g., compute units and memory units) in a programmable interconnect fabric. The array of configurable units in a reconfigurable processor is partitionable into a plurality of sub-arrays (or tiles) of configurable units.

The pool of reconfigurable data flow resources 1258 also includes bus resources (or transfer resources). Examples of the bus resources include PCIe channels, DMA channels, and DDR channels. The pool of reconfigurable data flow resources 1258 also includes memory resources (or storage resources). Examples of the memory resources include main memory (e.g., off-chip/external DRAM), local secondary storage (e.g., local disks (e.g., HDD, SSD)), and remote secondary storage (e.g., distributed file systems, web servers). Other examples of the memory resources include latches, registers, and caches (e.g., SRAM). The pool of reconfigurable data flow resources 1258 is dynamically scalable to meet the performance objectives required by applications 1202 (or user applications 1202). The applications 1202 may access the pool of reconfigurable data flow resources 1258 over one or more networks (e.g., Internet).

In some implementations, different compute scales and hierarchies form the pool of reconfigurable data flow resources 1258 according to different implementations of the technology disclosed. In one example, the pool of reconfigurable data flow resources 1258 is a node (or a single machine) that runs a plurality of reconfigurable processors, supported by required bus and memory resources. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor. In another example, the pool of reconfigurable data flow resources 1258 is a rack (or cluster) of nodes, such that each node in the rack runs a respective plurality of reconfigurable processors and includes a respective host processor configured with a respective runtime processor. The runtime processors are distributed across the nodes and communicate with each other so that they have unified access to the reconfigurable processors attached not only to their own node on which they run, but also to the reconfigurable processors attached to every other node in the data center.

The nodes in the rack are connected, for example, over Ethernet or InfiniBand (IB). In yet another example, the pool of reconfigurable data flow resources 1258 is a pod that comprises a plurality of racks. In yet another example, the pool of reconfigurable data flow resources 1258 is a superpod that comprises a plurality of pods. In yet another example, the pool of reconfigurable data flow resources 1258 is a zone that comprises a plurality of superpods. In yet another example, the pool of reconfigurable data flow resources 1258 is a data center that comprises a plurality of zones.

The applications 1202 are executed on the reconfigurable processors in a distributed fashion by programming the individual compute and memory components to asynchronously receive, process, and send data and control information. In the reconfigurable processors, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produces outputs that are written to one or more output buffers. The structure of these pipelines depends on the control and dataflow graph representing the application. Pipelines can be arbitrarily nested and looped within each other.

The applications 1202 can include high-level programs. A high-level program is source code written in programming languages like C, C++, Java, JavaScript, Python, and Spatial, for example, using deep learning frameworks like PyTorch, TensorFlow, ONNX, Caffe, and Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

In some implementations, a software development kit (SDK) generates computation graphs (e.g., data flow graphs, control graphs) of the high-level programs of the applications 1202. The SDK transforms the input behavioral description of the high-level programs into an intermediate representation such as the computation graphs. This may include code optimization steps like false data dependency elimination, dead-code elimination, and constant folding. The computation graphs encode the data and control dependencies of the high-level programs.

The computation graphs comprise nodes and edges. The nodes can represent compute operations and memory allocations. The edges can represent data flow and control flow. In some implementations, each loop in the high-level programs can be represented as a "controller" in the computation graphs. The computation graphs support branches, loops, function calls, and other variations of control dependencies. In some implementations, after the computation graphs are generated, additional analyses or optimizations focused on loop transformations can be performed, such as loop unrolling, loop pipelining, loop fission/fusion, and loop tiling.

The SDK also supports programming the reconfigurable processors in the pool of reconfigurable data flow resources 1258 at multiple levels, for example, from the high-level deep learning frameworks to C++ and assembly language. In some implementations, the SDK allows programmers to develop code that runs directly on the reconfigurable processors. In other implementations, the SDK provides libraries that contain predefined functions like linear algebra operations, element-wise tensor operations, non-linearities, and reductions required for creating, executing, and profiling the computation graphs on the reconfigurable processors. The SDK communicates with the deep learning frameworks via APIs.

A compiler 1214 transforms the computation graphs into a hardware-specific configuration, which is specified in an execution file generated by the compiler 1214. In one implementation, the compiler 1214 partitions the computation graphs into memory allocations and execution fragments, and these partitions are specified in the execution file. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously. The compiler 1214 may also generate arguments for the execution of the computation graphs that may change over various portions of the execution of the computation graph. Arguments may include such things as immediate values for computation, initial counter values, and the like.

Memory allocations represent the creation of logical memory spaces in on-chip and/or off-chip memories for data required to implement the computation graphs, and these memory allocations are specified in the execution file. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 1214 binds memory allocations to virtual memory units and binds execution fragments to virtual compute units, and these bindings are specified in the execution file. In some implementations, the compiler 1214 partitions execution fragments into memory fragments and compute fragments, and these partitions are specified in the execution file. A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compiler 1214 performs the partitioning using reverse data-flow analysis such that inputs to an address used in a memory access are recursively flagged until the compiler 1214 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The compiler 1214 assigns the memory fragments to the virtual memory units and assigns the compute fragments to the virtual compute units, and these assignments are specified in the execution file. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 1214 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file. The compiler 1214 places the physical memory units and the physical compute units onto positions in an array of configurable units of the reconfigurable processor and routes data and control networks between the placed positions, and these placements and routes are specified in the execution file. In one implementation, this includes allocating physical resources such as counters and registers within each physical memory and compute unit, and these allocations are specified in the execution file.

The compiler 1214 translates the applications 1202 developed with commonly used open-source packages such as Keras and PyTorch into reconfigurable processor specifications. The compiler 1214 generates the configuration files 1224 with configuration data for the placed positions and the routed data and control networks. The configuration data can include an initial value for the arguments as well. In one implementation, this includes assigning coordinates and communication resources of the physical memory and compute units by placing and routing units onto the array of the processor while maximizing bandwidth and minimizing latency.

The execution file includes configuration files 1224 that implement the computation graphs of the applications 1202 using the configurable units in the reconfigurable processors. A program executable contains a bit-stream representing the initial configuration, or starting state, of each of the configurable units that execute the program. This bit-stream is referred to as a bit file, or herein as a configuration file. The execution file includes a header that indicates destinations on the reconfigurable processors for configuration data in the configuration files 1224. In some implementations, a plurality of configuration files is generated for a single application.

The execution file includes metadata 1226 that accompanies the configuration files 1224 and specifies modifications to the configuration files 1224. The modifications specified in the metadata 1226 include updates to argument data (or arguments) in the configuration files 1224. The argument data may be included in one or more argument load files 1228. An argument load file 1228 for a fast argument load operation has a minimum size of zero and a maximum size equaling a maximum number of the (value, control) tuples representable by a number of bits of in the argument load size register. For an alternative argument load process, the argument load file 1228 has a minimum size equal to two times a number of configurable units in the array of configurable units, to allow at least one (value, control) tuple for each of the configurable units.

The argument data specifies execution parameters of the applications 1202. In some implementations, the arguments are specified by the users. In one implementation, the modifications specified in the metadata 1226 include updates to memory mapping data in the configuration files 1224. The memory mapping data translates virtual addresses of virtual data flow resources specified in the configuration files to physical addresses of the reconfigurable data flow resources allocated to the virtual data flow resources. In other implementations, the metadata 1226 specify modifications/changes/alterations to any content or aspect of the configuration files 1224.

A runtime processor 1232, configured with runtime program (or runtime program) 1236, uses the metadata 1226 to modify the configuration files 1224 to generate modified configuration files 1246. In some implementations, the runtime program 1236 may also or alternatively use the metadata 1226 to modify the argument load files 1228 to generate modified argument load files 1228.

The runtime processor 1232, configured with the runtime program 1236, loads and executes the modified configuration files 1246 on the arrays of configurable units in the pool of reconfigurable processors 1258. The runtime processor 1232, configured with the runtime program 1236, modifies the configuration files 1224 based on the metadata N times to generate the modified configuration files 1246, and iteratively loads and executes the modified configuration files 1246 on the arrays of configurable units M times, where M>>N. In one example, the configuration files 1224 are modified once (N=1) using the metadata 1226 to generate the modified configuration files 1246, and the modified configuration files 1246 are iteratively loaded and executed on the arrays of configurable units ten thousand times (M=10000). In another example, the configuration files 1224 are modified one hundred times (N=100) using the metadata 1226 to generate the modified configuration files 1246, and the modified configuration files 1246 are iteratively loaded and executed on the arrays of configurable units ten thousand times (M=10000). In other examples, N can be 2, 5, 10, 20, 100, or 200, and M can be 500, 2000, 20000, 100000, or 1000000, but in general M>=N.

The runtime processor 1232, configured with the runtime program 1236, can also load the modified argument load files 1248 into the arrays of configurable units in the pool of reconfigurable processors 1258. The runtime processor 1232, configured with the runtime program 1236, can modify the argument load files 1228 based on the metadata L times to generate the modified argument load files 1248, and may iteratively load the modified argument load files 1248 into the arrays of CGR units in the pool of reconfigurable resources 1258 any number of times between loading a different modified configuration file 1246. The modified argument load files 1248 may be loaded into the arrays of configurable units using either the fast argument load technique or an alternative argument load technique, depending on the implementation.

Figure 13:
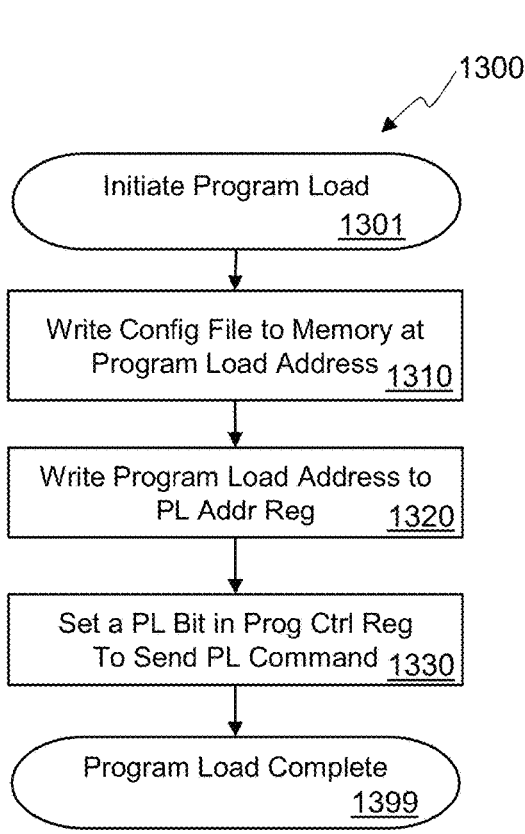
FIG. 13 is a flow chart for action of an example runtime program to perform a program load.

FIG. 13 is a flow chart 1300 for action of an example runtime program to perform a program load. It is expected that the program load will be a step taken in the process of preparing the CGR processor for performing data processing applications. It is expected that the CGR processor will include CGR arrays that can be programmed to simultaneously execute multiple dataflow graphs. The SDK distills dataflow graphs from applications written in high-level programming languages and transforms the high-level programs into computation graphs. The compiler transforms the computation graphs into hardware-specific configurations, and the runtime program loads the configurations into CGR units in the CGR array. Described herein, then, is a method including storing a configuration file into a memory accessible by the CGR processor and causing the program load controller to read a portion of the configuration file from the memory and distribute sub-files from the portion of the configuration data read from the memory to the CGR units. The program load process, then, is used to enable the runtime program to load configurations into the CGR units in the CGR processor.

The flow chart 1300 begins with Step 1301 where the runtime program initiates the program load. At Step 1310, the runtime program writes the configuration file, including sub-files of the configuration data, to a memory accessible by the reconfigurable processor at a starting physical memory address. The runtime program 170 may use a virtual address for writing the configuration data that is translated to a physical address by the system. The memory may be memory of a host 180 (referring to FIG. 1) which is accessible by the reconfigurable processor 110 through the I/O Interface 138 and communication link 185, or memory 190 coupled to the reconfigurable processor 110 through the memory interface 139 and the memory bus 195. In some implementations, the configuration file 165 may be stored in the memory of a host 180 and then copied to another memory, such as a memory 190 as a configuration file copy 165A which is accessible to the reconfigurable processor 110.

At Step 1320, the runtime program writes the starting physical address of the configuration file in the memory to the program load address register in the program load controller in the interface unit. This may be accomplished by the runtime program 170 (referring to FIG. 1) running on the host processor 180 writing to an address that is mapped to the I/O Interface 138 (i.e., an interface agent) on the external interface link 185. The I/O Interface 138 sends the write to the program load address register over an internal network (e.g., TLN) 130 to an interface unit of the CGR array 120 which includes the program load address register as well as a program control register 900. In some implementations, a starting virtual address of the configuration file may be written to the program load address register which is translated to a physical address by the reconfigurable processor. At Step 1330, the runtime program sets PL/Idle bit 901 or PL/Exec bit 902 of the program control register 900. In so doing, the runtime program 170 sends a program load command to a program load controller of the CGR array 120. The program load controller receives the program load command and responds by performing a program load process as shown in FIG. 10. The program load process can include reading a portion of the configuration file from the memory, sending a first signal from the program load controller to the configurable unit, and distributing the sub-files from the portion of the configuration data read from the memory to the configurable unit. The configurable unit receives the sub-files via the bus system and loads the received sub-files into the configuration data store, including the argument registers, by sequentially shifting data of the received sub-files into the shift register. The runtime program 170 has finished its part of the program load at Step 1399, although in some cases, the runtime program 170 may monitor the program control register and/or wait for an interrupt to verify that the program load process completes successfully.

The CGR array 120 includes a bus system (e.g., ALN) that connects the interface unit, a program load controller, and a fast argument load (FAL) controller. A configurable unit in the array of configurable units 120 includes a configuration data store, organized as a shift register, to store configuration data. The configuration data store also includes individually addressable argument registers respectively comprising word-sized portions of the shift register adapted to provide arguments to the configurable unit.

In some implementations, the CGR processor 110 includes a plurality of quiesceable arrays, and the runtime processor 170 sends a quiesce command to a quiesceable array by writing the quiesce bit 909 to the program control register 900. The quiesceable array includes a quiesce controller to respond to a quiesce command received from the runtime program 170 running on the host processor 180 by executing a quiesce process, including distributing the quiesce control signal to the configurable units in the quiesceable array, receiving quiesce ready signals from the respective configurable units, setting a quiesce ready bit of a tile status register and generating an interrupt to the host processor. Once the quiesceable array has finished the quiesce process, the runtime program 170 can send the program load command to the quiesceable array that has been quiesced. Indeed, in some implementations, the runtime program 170 can alternate between issuing program load commands, issuing quiesce commands, and issuing FAL commands to multiple CGR arrays.

Figure 14:
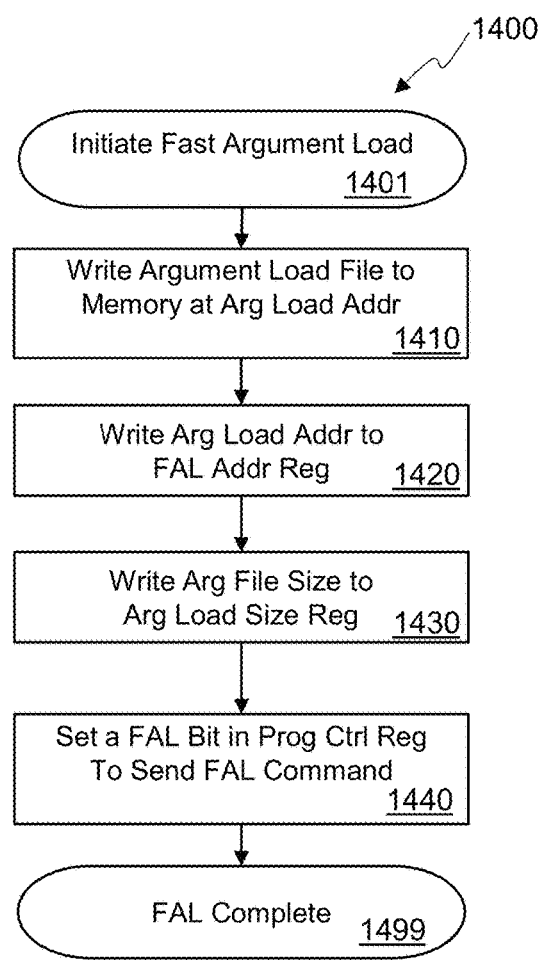
FIG. 14 is a flow chart for action of an example runtime program to perform a fast argument load.

FIG. 14 is a flow chart 1400 for action of an example runtime program to perform a fast argument load. It is expected that the runtime processor will perform initial configuration of all of the CGR units that will be used for executing a graph fragment. Executing the program load processes on the CGR units in the CGR array by sequentially shifting configuration bits into the configuration data stores of each of the CGR units may take a very long time. But the amount of time required for the initial configuration may be tolerable if it only rarely occurs. After the initial configuration is done, subsequent, later modifications to configuration data stores may be accomplished without fundamentally changing the configuration of the CGR units in the CGR array, but by simply updating the argument registers within the configuration data stores of the CGR units. This may be accomplished using a fast argument load functionality to only update those argument registers in those CGR units that actually need to be updated for the next execution of the graph fragment implemented in the CGR array. Described herein, then, is a method performed by the runtime program, the method including taking as much time as is needed to store initial configurations into CGR units of the CGR array as illustrated and described in FIG. 13, and then performing updates to argument registers making up portions of configurations stored in configuration data stores of the CGR units using the fast argument load, as shown in FIG. 14.

The runtime program 170, then, initiates the fast argument load (FAL) at Step 1401. At Step 1410, the runtime program 170 stores the argument load file 168, including argument load information, to the memory accessible by the reconfigurable processor 110 at a starting physical memory address. The runtime program 170 may use a virtual address for writing the argument load information that is translated to a physical address by the system. The memory may be memory of a host 180 which is accessible by the reconfigurable processor 110 through the I/O Interface 138 and communication link 185, or memory 190 coupled to the reconfigurable processor 110 through the memory interface 139 and the memory bus 195. In some implementations, the argument load file 168 may be stored in the memory of a host 180 and then copied to another memory, such as a memory 190 as an argument load file copy 168A which is accessible to the reconfigurable processor 110.

At Step 1420, the runtime program 170 writes the starting physical address of the argument load file 168, 168A to an argument load address register in the interface unit. This may be accomplished by the runtime program 170 writing to an address that is mapped to the I/O Interface 138 (i.e., an interface agent) on the external interface link 185. The I/O Interface 138 sends the write to the argument load address register over an internal network (e.g., TLN) 130 to an interface unit of the CGR array 120 which includes the argument load address register as well as a program control register 900. In some implementations, a starting virtual address of the argument load file may be written to the argument load address register which is translated to a physical address by the reconfigurable processor. The runtime program 170 also writes a file size of the argument load file to an argument load size register in the interface unit at Step 1430. The size may be a multiple of 64 bytes. The runtime program 170 sends an FAL command to an FAL controller in the reconfigurable processor 110 by setting the FAL/Idle bit 903 or the FAL/Exec bit 904 in the program control register 900 at Step 1440. The FAL controller receives the FAL command and responds by executing an FAL process that includes sending a second signal from the FAL controller to the configurable unit, reading a portion of the argument load information from the memory, the portion of the argument load information including one or more argument values to be loaded into respective argument registers in the configurable unit, and distributing the portion of the argument load information to the configurable unit. The configurable unit receives the argument load information via the bus system at the configurable unit and loads the one or more argument values into the one or more respective argument registers without shifting the one or more argument values through the shift register. The runtime program 170 has finished its part of the fast argument load at Step 1499, although in some cases, the runtime program 170 may monitor the program control register and/or wait for an interrupt to verify that the FAL process completes successfully.

In implementations, the runtime program may write a configuration file, including initial values for arguments, to a first starting physical memory address in the memory accessible to the CGR processor and then write the first starting physical memory address to the program load address register of the program load controller of the CGR array before sending a program load command to the program load controller to initiate a program load process where the configuration file is loaded into the configuration data stores of the CGR units of the CGR array using the first starting physical memory address for the reading the configuration file from the memory. The CGR array can then begin execution of the fragment of the graph configured in the CGR array.

The runtime program can also write a first argument load file to a second starting physical memory address in the memory accessible to the CGR processor. This can be done concurrently with the execution of the program load process by the program load controller, concurrently with the execution of the fragment of the graph by the CGR array, or after the execution of the fragment of the graph by the CGR array using the initial values for the arguments. Once the execution of the fragment of the graph by the CGR array using the initial values for the arguments has completed, the runtime program can write the second starting physical memory address to an argument load address register of an FAL controller of the CGR array. The FAL controller can then initiate an FAL process using the second starting physical memory address for the reading of the portion of the first argument load information from the memory. The FAL process then updates the argument registers specified in the first argument load file before the CGR array begins execution of the graph fragment using the updated argument values.

The runtime program can also write a second argument load file to a third starting physical memory address in the memory accessible to the CGR processor. This can be done concurrently with the execution of the first FAL process by the FAL controller, concurrently with the execution of the fragment of the graph by the CGR array using the argument values from the first argument load file, or after the execution of the fragment of the graph by the CGR array using the argument values from the first argument load file. Once the execution of the fragment of the graph by the CGR array using the argument values from the first argument load file has completed, the runtime program can write the third starting physical memory address to an argument load address register of the FAL controller of the CGR array. The FAL controller can then initiate another FAL process using the third starting physical memory address for the reading of the portion of the second argument load information from the memory. The FAL process then updates the argument registers specified in the second argument load file before the CGR array begins execution of the graph fragment using the updated argument values.

The previous example illustrates the process of first taking as long as is needed to perform the flow 1300 to load an initial configuration into a CGR unit, followed later by fast updates to argument registers by first storing an argument load file to memory, then writing the starting address of argument load file to argument load address register in the FAL controller, writing the size of argument load file to argument load size register in the FAL controller, and then writing an FAL bit of the program control register to kick of the FAL process.

Indeed, in another example, the runtime program can store a pair of argument load files in the memory accessible by the CGR units. The runtime program can load an initial configuration into a CGR unit using the program load process. After letting the CGR unit execute for a first time period, the runtime program can write the address and size of the first argument load file to FAL controller. The runtime program can allow the CGR unit to continue executing for a second time period, quiesce the CGR array, write the address and size of the second argument load file to FAL controller, then set the FAL bit of program control register to kick off the FAL process using the second argument load file.

The runtime processor 170, in yet another example, sends a quiesce command to a quiesceable array by writing the quiesce bit 909 to the program control register 900. The quiesceable array includes a quiesce controller to respond to a quiesce command received from the runtime program 170 running on the host processor 180 by executing a quiesce process, including distributing the quiesce control signal to the configurable units in the quiesceable array, receiving quiesce ready signals from the respective configurable units, setting a quiesce ready bit of a tile status register and generating an interrupt to the host processor. Once the quiesceable array has finished the quiesce process, the runtime program 170 can send the program load command to the quiesceable array that has been quiesced. Indeed, in some implementations, the runtime program 170 can alternate between issuing program load commands, issuing quiesce commands, and issuing FAL commands to multiple CGR arrays.

In some implementations, the CGR processor 110 includes a plurality of quiesceable arrays, and a quiesceable array is selected to implement an execution fragment of a data processing operation. The quiesceable array of configurable units may be configurable to allocate a plurality of sets of configurable units in the array to implement respective execution fragments of the data processing operation. The configurable units in the quiesceable array include quiesce logic configurable to respond to a quiesce control signal to quiesce the configurable unit on a quiesce boundary of the execution fragment. The quiesce logic in the configurable units may also be configurable to define a plurality of quiesce boundaries in the execution fragment, and to quiesce the configurable units in the plurality of sets of configurable units on a common quiesce boundary in the plurality of quiesce boundaries.

The quiesceable array includes a quiesce controller to respond to a quiesce command by executing a quiesce process, including distributing the quiesce control signals to the configurable units in the quiesceable array, receiving quiesce ready signals from the respective configurable units, setting a quiesce ready bit of a tile status register, and generating an interrupt to the host processor. The quiesceable array also includes an FAL controller that performs the FAL process on the quiesceable array when the quiesceable array is quiesced. Other remaining arrays of configurable units selected from among the plurality of arrays can continue operations irrespective of a state of the quiesceable array.

In some implementations, the runtime program is configurable to issue program load commands to each of the plurality of arrays of configurable units, use the plurality of arrays of configurable units to execute fragments of the data processing operation for a first time period. It may then issue quiesce commands to one or more arrays of configurable units and issue FAL commands to those arrays to update arguments therein using argument load files. The runtime program may use first and second argument load files in memory, and repeatedly alternates between executing the first argument load file while updating the second argument load file. The arrays can then be used to execute the fragments of the data processing operation for a second time period. The first and second time period can be any amount of time, but the first time period may be much shorter than the second time period. For example, the first period of time may be in the range of one second, and the second period of time may be in the range of one hour.

EXAMPLES

Examples of various implementations are described in the following paragraphs:

Example A1. A reconfigurable processor comprising: an array of configurable units connected by a bus system, a configurable unit in the array of configurable units including a configuration data store, organized as a shift register, to store configuration data, the configuration data store also including individually addressable argument registers respectively comprising word-sized portions of the shift register adapted to provide arguments to the configurable unit, the configurable unit further including program load logic to receive sub-files of the configuration data via the bus system and to load the received sub-files into the configuration data store, including the argument registers, by sequentially shifting the received sub-files into the shift register, the configurable unit further including argument load logic to receive argument data via the bus system and load the received argument data into the argument registers without shifting the received argument data through the shift register; a program load controller associated with the array to respond to a program load command by executing a program load process, including sending a first signal to the configurable unit, and subsequently distributing a configuration file comprising the sub-files of configuration data to the configurable unit in the array as specified in the configuration file; and a fast argument load (FAL) controller associated with the array to respond to an FAL command by executing an FAL process, including sending a second signal to the configurable unit, and subsequently distributing (value, control) tuples to the configurable unit as specified in an argument load file.

Example A2. The reconfigurable processor of example A1, wherein the shift register comprises a multi-bit wide shift chain that includes the individually addressable argument registers, and the configurable unit is configured to provide multiple access modes to an argument register of the individually addressable argument registers, the multiple access modes including: a first access mode of sequentially shifting argument data into the argument register via the multi-bit wide shift chain; and a second access mode of accessing the argument register directly without changing data loaded into other parts of the shift register.

Example A3. The reconfigurable processor of example A1, wherein the configurable units in the array of configurable units are further connected in an interconnect topology, separate from, and in addition to, the bus system, the interconnect topology comprising a daisy chain used by the configurable unit to indicate completion of at least a portion of loading the received sub-files of the configuration data or loading the received argument data.

Example A4. The reconfigurable processor of example A1, wherein the configurable unit is configurable to transition to an IDLE state, to abandon execution of the FAL process, and to set an error bit of a tile status register in response to receiving an error during a memory access.

Example A5. The reconfigurable processor of example A1, wherein the argument load logic in the configurable unit is configured to cause a component state machine in the configurable unit to transition from a current state to an argument load state in response to receiving the second signal.

Example A6. The reconfigurable processor of example A5, wherein the current state of the configurable unit is one of idle, program load, checkpoint, execute, or quiesce.

Example A7. The reconfigurable processor of example A5, wherein the configurable unit is configured to, while in the argument load state, receive a (value, control) tuple, and write a value included in the (value, control) tuple to an argument register of the individually addressable argument registers identified by a register identifier included in the (value, control) tuple, and signal completion of the write of the value to the argument register by sending a response packet to the FAL controller.

Example A8. The reconfigurable processor of example A7, wherein the FAL controller is configured to send the (value, control) tuple to the configurable unit over a vector network of the bus system using dimension order routing, and the configurable unit is configured to send the response packet including a set control bit to the FAL controller over a scalar network of the bus system.

Example A9. The reconfigurable processor of example A7, wherein the configurable unit remains in the argument load state until it receives a different command.

Example A10. The reconfigurable processor of example A1, wherein the argument load file includes a list of (value, control) tuples specifying values to be written to argument registers, the list containing a (value, control) tuple for argument registers to be written by the FAL controller during a single invocation of the FAL process.

Example A11. The reconfigurable processor of example A10, wherein each (value, control) tuple includes a value word of data to be written to an argument register and a control word of data indicating a location of an argument register of the argument registers to be written.

Example A12. The reconfigurable processor of example A11, wherein the control word of data includes an ID of the argument register to be written and a destination identification of the configurable unit containing the argument register to be written.

Example A13. The reconfigurable processor of example A12, wherein the destination identification identifies a row in the array of configurable units containing the configurable unit, a column in the array of configurable units containing the configurable unit, and a type of the configurable unit, the type being one of memory unit, compute unit, switch, and interface unit.

Example A14. A method for operating a reconfigurable processor that includes an array of configurable units connected by a bus system to a program load controller and a fast argument load (FAL) controller, a configurable unit in the array of configurable units including a configuration data store, organized as a shift register, to store configuration data, the configuration data store also including individually addressable argument registers respectively comprising word-sized portions of the shift register adapted to provide arguments to the configurable unit, the method comprising: receiving a program load command and responding by: obtaining a configuration file including sub-files of the configuration data; sending a first signal from the program load controller to the configurable unit; and distributing the sub-files of configuration data to the configurable unit; receiving the sub-files of the configuration data via the bus system at the configurable unit; and loading the received sub-files into the configuration data store, including the argument registers, by sequentially shifting data of the received sub-files into the shift register; and receiving an FAL command and responding by executing an FAL process that includes: sending a second signal from the FAL controller to the configurable unit; obtaining argument load information including one or more argument values to be loaded into respective argument registers in the configurable unit; distributing the argument load information to the configurable unit; receiving the argument load information via the bus system at the configurable unit; and loading the one or more argument values into the respective argument registers without shifting the one or more argument values through the shift register.

Example A15. The method of example A14, wherein the argument load information includes one or more (value, control) tuples that respectively provide one argument value and an identifier of a respective argument register in the configurable unit, the method further comprising: sending the one or more (value, control) tuples from the FAL controller to the configurable unit over a vector network of the bus system; and sending, by the configurable unit to the FAL controller over a scalar network of the bus system, a response packet for each (value, control) tuple processed, the response packet including a set control bit to indicate completion of the loading of one of the one or more argument values into its respective argument register.

Example A16. The method of example A15, wherein the one or more (value, control) tuples are routed through the vector network of the bus system using dimension-order routing; and the response packet for each (value, control) tuple processed is routed through the scalar network of the bus system using dimension-order routing.

Example A17. The method of example A14, wherein the argument load information is included in an argument load file comprising a list of (value, control) tuples to be processed during a single invocation of the FAL process, each (value, control) tuple including a value word of data to be written to an argument register and a control word of data including an ID of the argument register to be written and a destination identification of a target configurable unit in the array of configurable units containing the argument register to be written, the destination identification identifying a row in the array of configurable units containing the target configurable unit, a column in the array of configurable units containing the target configurable unit, and a type of the target configurable unit, the type being one of memory unit, compute unit, switch, or interface unit.

Example A18. The method of example A14, further comprising transitioning the FAL controller to an IDLE state, abandoning execution of the FAL process, and setting an error bit of a tile status register in response to receiving an error during a memory access.

Example A19. The method of example A14, further comprising transitioning argument load logic in the configurable unit from a current state to an argument load state in response to receiving the second signal, the current state being one of idle, program load, argument load, checkpoint, execute, or quiesce.

Example A20. The method of example A19, further comprising: receiving, while the argument load logic is in the argument load state, a (value, control) tuple at the configurable unit; writing a value included in the (value, control) tuple to an argument register of the individually addressable argument registers identified by a register identifier included in the (value, control) tuple; and sending a response packet with a set control bit to the FAL controller after completion of the writing.

Example A21. The method of example A18, further comprising generating an interrupt after setting the error bit of the tile status register.

Example A22. The reconfigurable processor of example A1, wherein the FAL controller contains an argument load size register writeable to specify the size of the argument load file in multiples of 64 bytes.

Example A23. The reconfigurable processor of example A22, wherein the argument load file has a minimum size of zero and a maximum size equaling a maximum number of (value, control) tuples representable by a number of bits of the argument load size register.

Example A24. The reconfigurable processor of example A22, wherein the array of configurable units is associated with a multi-bit program control register, selected bits of which are writeable to trigger execution of a process selected from among multiple processes, the multiple processes including the FAL process and the program load process.

Example A25. The reconfigurable processor of example A24, wherein the FAL controller is configured, upon completion of the FAL process, to clear an FAL process bit of the program control register that had been written to trigger execution of the FAL process, and the program load controller is configured, upon completion of the program load process, to clear a program load bit of the program control register that had been written to trigger execution of the program load process.

Example A26. The reconfigurable processor of example A10, wherein a (value, control) tuple includes a word-sized value to be written to an argument register and a word-sized control indicating a location of the argument register to be written.

Example A27. The reconfigurable processor of example A26, wherein the location of the argument register to be written includes an ID of the argument register to be written and a destination identification of a target configurable unit in the array of configurable units containing the argument register to be written.

Example A28. The reconfigurable processor of example A27, wherein the destination identification identifies a row containing the target configurable unit, a column containing the target configurable unit, and a type of the target configurable unit, the type being one of memory unit, compute unit, switch, or interface unit.

Example A29. The reconfigurable processor of example A1, wherein the argument load file has a minimum size of two times a number of configurable units in the array of configurable units plus two, in order to allow at least one entry for each of the configurable units.

Example A30. The reconfigurable processor of example A1, wherein the FAL controller is associated with an argument load address register, an argument load size register, and one or more argument load bits of a multi-bit program control register, wherein the FAL controller is configured to recognize a write to at least one of the argument load address register, the argument load size register, or an argument load bit of the one or more argument load bits of the multi-bit program control register.

Example A31. The reconfigurable processor of example A30, wherein the FAL controller is configured to begin the FAL process by broadcasting the second signal to the configurable units in the array of configurable units in order to place the configurable units into an argument load state.

Example A32. The reconfigurable processor of example A31, wherein the FAL controller, once the second signal has been received by all of the configurable units in the array of configurable units, begins to retrieve the argument load file by issuing a memory access request to a physical address of the argument load file as stored in the argument load address register, and receives data of the argument load file in response to the memory access request.

Example A33. The reconfigurable processor of example A32, wherein the FAL controller is configured to receive one block of data in response to the memory access request, wherein the block of data contains a plurality of (value, control) tuples.

Example A34. The reconfigurable processor of example A33, wherein the FAL controller is configured to distribute (value, control) tuples from the argument load file to the configurable units in the array of configurable units over a vector network of the bus system, one (value, control) tuple at a time, and to receive response packets with a control bit set in response to distributed (value, control) tuples over a scalar network of the bus system.

Example A35. The reconfigurable processor of example A34, wherein the FAL controller is configured to continue reading the argument load file one block of data at a time until as many (value, control) tuples as are specified in the argument load file size register have been read and distributed.

Example A36. The reconfigurable processor of example A35, wherein the FAL controller is configured to maintain a count of unprocessed (value, control) tuples sent to configurable units in the array of configurable units that have not yet been processed by the configurable units.

Example A37. The reconfigurable processor of example A36, wherein a (value, control) tuple is routed over the vector network to a row and column destination of a configurable unit as specified in the (value, control) tuple using dimension-order routing, wherein a row dimension is traversed before a column dimension.

Example A38. The reconfigurable processor of example A37, wherein a configurable unit that receives a (value, control) tuple while in the argument load state is configured to load data contained in the (value, control) tuple into the argument register indexed by a register ID contained in the (value, control) tuple, the configurable unit configured to subsequently report completion of the argument load by sending a response packet with a control bit set to the FAL controller over the scalar network.

Example A39. The reconfigurable processor of example A38, wherein the FAL controller is configured to decrement the count of unprocessed (value, control) tuples sent with every scalar response packet with a control bit set received from configurable units over the scalar network.

Example A40. The reconfigurable processor of example A39, wherein once all of the (value, control) tuples specified in the argument load file size register have been read from the argument load file, and once the count of unprocessed (value, control) tuples sent reaches zero, the FAL process is complete, and the FAL controller deasserts the second signal, sets an argument load complete bit of a tile status register, and generates an interrupt.

Example A41. The reconfigurable processor of example A40, wherein the FAL controller, once the FAL process is complete, returns either to an idle state or to an execute state, depending on which bit of the program control register had been written to initiate the FAL process.

Example A42. The reconfigurable processor of example A5, wherein the FAL controller performs the FAL process without sending an indication of how many argument registers, M, will be loaded to the configurable unit before distributing the (value, control) tuples to the configurable unit, and the configurable unit accepts and processes (value, control) tuples received as long as it is in the argument load state.

Example A43. The reconfigurable processor of example A42, wherein the FAL controller is configurable to perform an alternate argument load process.

Example A44. The reconfigurable processor of example A43, wherein the alternate argument load process uses an alternate argument load file that contains a first section specifying a respective number of argument registers, M, to be written in each configurable unit in the array of configurable units, and a second section listing (value, control) tuples for argument registers that need to be written during the alternate argument load process, wherein a minimum size of the first section is based on a total number of configurable units in the array of configurable units, and a minimum size of the second section is zero, if no argument registers need to be written during the alternate argument load process.

Example A45. The reconfigurable processor of example A44, wherein the FAL controller is configured to begin the alternate argument load process by performing a first step consisting of writing the respective M from the first section of the alternate argument load file to a number of arguments register in each configurable units of the array of configurable units to indicate how many (value, control) tuples each configurable unit should expect to receive during the alternate argument load process, wherein the number of arguments register in each configurable unit of the array of configurable units is written even if the value is zero.

Example A46. The reconfigurable processor of example A45, wherein a configurable unit in the array of configurable units is configurable to report completion of the alternate argument load process to the FAL controller after the respective M (value, control) tuples have been received and processed, configurable units in the array of configurable units being configurable to report completion to the FAL controller after writing argument data to M argument registers, wherein the completion is communicated to the FAL controller via an interconnect topology, rather than via a scalar network of the reconfigurable processor.

Example A47. The reconfigurable processor of example A43, wherein the alternate argument load process is useable to provide an alternate mechanism in case a scalar network of the reconfigurable processor is not operational to report completion of the argument register loads.

Example A48. The reconfigurable processor of example A1, wherein the first signal is a pr-program-load signal and the second signal is a pr-argument-load signal.

Example A49. The reconfigurable processor of example A48, wherein the program load process further includes broadcasting the pr-program-load signal to configurable units in the array of configurable units so as to transition the configurable units into a state of awaiting sub-files of configuration data, generating memory access requests to a memory starting at an address stored in a program load address register, receiving configuration file data from the memory, and distributing sub-files of configuration data to configurable units in the array of configurable units as specified by the configuration file.

Example A50. The reconfigurable processor of example A1, further comprising a plurality of arrays of configurable units including the array of configurable units: a quiesceable array of configurable units selected from among the plurality of arrays being configurable to implement an execution fragment of a data processing operation, the configurable units in the quiesceable array further comprising quiesce logic configurable to respond to a quiesce control signal to quiesce the configurable unit on a quiesce boundary of the execution fragment, the quiesceable array further comprising a quiesce controller to respond to a quiesce command by executing a quiesce process, including distributing the quiesce control signals to the configurable units in the quiesceable array, receiving quiesce ready signals from the respective configurable units, setting a quiesce ready bit of a tile status register, and generating an interrupt, the quiesceable array further including an FAL controller that performs the FAL process on the quiesceable array when the quiesceable array is quiesced, remaining arrays of configurable units selected from among the plurality of arrays being configurable to continue operations irrespective of a state of the quiesceable array.

Example A51. The reconfigurable processor of example A50, wherein multiple arrays of the plurality of arrays are quiesceable.

Example A52. The reconfigurable processor of example A50, wherein the quiesce logic in the configurable units is configurable to define a plurality of quiesce boundaries in the execution fragment, and to quiesce the configurable units in the plurality of sets of configurable units on a common quiesce boundary in the plurality of quiesce boundaries.

Example A53. The reconfigurable processor of example A50, wherein the quiesce logic in a configurable unit in a quiesceable array of configurable units further includes a skew counter to track differences in progress of the execution fragment among the configurable units in the set of configurable units.

Example A54. The reconfigurable processor of example A50, wherein at least one configurable unit in each set of configurable units is configured as a producer of inputs, and at least one configurable unit in the set of configurable units is configured as a consumer of inputs, and the quiesce logic in each configurable unit is configurable to stop the producer on the quiesce boundary.

Example A55. The reconfigurable processor of example A50, wherein the quiesce controller of the quiesceable array of configurable units is configured to respond to a cache_arg_writes_for_later bit of the program control register, causing the FAL controller of the quiesceable array to cache FAL commands received, the cached FAL commands to be executed at a later stage.

Example A56. The reconfigurable processor of example A50, wherein a program control register of the quiesceable array of configurable units includes a do_arg_load even if running bit that, if set, causes the configurable units in the respective array to accept and implement argument (value, control) tuples via a vector network of the bus system even if the configurable units are in an execute state.

Example B1. A reconfigurable processor comprising: an array of configurable units connected by a bus system, a configurable unit in the array of configurable units including a configuration data store, organized as a shift register, to store configuration data, the configuration data store also including individually addressable argument registers respectively comprising word-sized portions of the shift register adapted to provide arguments to the configurable unit, the configurable unit further including program load logic to receive sub-files of the configuration data via the bus system and to load the received sub-files into the configuration data store by sequentially shifting the received sub-files into the shift register, the configurable unit further including argument load logic to receive argument data via the bus system and load the received argument data into the argument registers without shifting the received argument data through the shift register; a program load controller associated with the array to respond to a program load command by executing a program load process, including distributing a configuration file comprising the sub-files of configuration data to the configurable unit in the array as specified in the configuration file; a fast argument load (FAL) controller associated with the array to respond to an FAL command by executing an FAL process, including distributing (value, control) tuples to the configurable unit as specified in an argument load file; an interface unit in the array of configurable units, the interface unit coupled to the bus system; an internal network coupled to the interface unit; and an interface agent coupled between an external interface link and the internal network, to communicate data between the interface link and the interface unit of the array of configurable units over the internal network, the interface agent configured to communicate with a host processor via the external interface link, and configurable to receive register read and register write requests from a runtime program running on the host processor that are addressed to memory-mapped registers in the interface unit of the array of configurable units and send the register read and register write requests over the internal network to the interface unit of the array of configurable units.

Example B2. The reconfigurable processor of example B1, the interface unit including the program load controller and a program load address register writeable by the runtime program running on the host processor to indicate a starting physical memory address of the configuration file to be used by the program load controller.

Example B3. The reconfigurable processor of example B1, the interface unit including the FAL controller and an argument load address register writeable by the runtime program running on the host processor to indicate a starting physical memory address of the argument load file to be used by the FAL controller.

Example B4. The reconfigurable processor of example B3, the interface unit further including an argument load size register writeable by the runtime program running on the host processor to indicate a file size of the argument load file to be used by the FAL controller.

Example B5. The reconfigurable processor of example B1, the interface unit including the program load controller, the FAL controller, and a multi-bit program control register, selected bits of which are writeable by the runtime program running on the host processor to trigger execution of a process selected from among multiple processes, the multiple processes including the FAL process and the program load process.

Example B6. The reconfigurable processor of example B5, wherein the interface unit, after completion of the selected process, clears a bit of the program control register that had been set by the runtime program running on the host processor to trigger execution of the selected process.

Example B7. The reconfigurable processor of example B1, the interface unit including the FAL controller, an argument load address register, an argument load size register, and a program control register; the FAL controller configured to recognize the FAL command in response to a write to at least one of the argument load address register, the argument load size register, or one or more argument load bits of the program control register by the runtime program running on the host processor.

Example B8. The reconfigurable processor of example B1, the interface unit comprising the program load controller, a program load address register, and one or more program load bits of a program control register; the program load controller further configured to recognize the program load command in response to a write to at least one of the program load address register or the one or more program load bits of the program control register by the runtime program running on the host processor.

Example B9. The reconfigurable processor of example B8, wherein the program load process includes: broadcasting a program load signal to configurable units of the array of configurable units, including the configurable unit, to transition the configurable units into a state of awaiting configuration sub-files; generating memory access requests to a memory starting at an address stored in the program load address register; receiving the sub-files of the configuration data from the memory; and distributing the sub-files of the configuration data to the configurable units.

Example B10. The reconfigurable processor of example B1, further comprising a plurality of arrays of configurable units including the array of configurable units; wherein the array of configurable units is a quiesceable array of configurable units configurable to implement an execution fragment of a data processing operation, configurable units in the quiesceable array further comprising quiesce logic configurable to respond to a quiesce control signal to quiesce the configurable unit on a quiesce boundary of the execution fragment; the quiesceable array further comprising a quiesce controller to respond to a quiesce command received from the runtime program running on the host processor by executing a quiesce process, including distributing the quiesce control signal to the configurable units in the quiesceable array, receiving quiesce ready signals from the respective configurable units, setting a quiesce ready bit of a tile status register and generating an interrupt to the host processor; wherein the FAL controller is configurable to execute the FAL process on the quiesceable array when the quiesceable array is quiesced, remaining arrays of configurable units among the plurality of arrays of configurable units configurable to continue operations irrespective of a state of the quiesceable array.

Example B11. The reconfigurable processor of example B10, wherein multiple arrays of the plurality of arrays are quiesceable.

Example B12. The reconfigurable processor of example B10, wherein the runtime program is configurable to issue program load commands to each of the plurality of arrays of configurable units, use the plurality of arrays of configurable units to execute fragments of the data processing operation for a first time period, then issue quiesce commands to one or more arrays of configurable units of the plurality of arrays of configurable units, issue FAL commands to the one or more arrays of configurable units of the plurality of arrays of configurable units to update arguments therein, and execute the fragments of the data processing operation for a second time period.

Example B13. The reconfigurable processor of example B10, wherein the runtime program is configurable to issue program load commands to the plurality of arrays, use the plurality of arrays to execute fragments of the data processing operation for a first time period, then repeatedly issue quiesce commands to each of the plurality of arrays, issue FAL commands to each of the plurality of arrays to update arguments therein, and execute the fragments of the data processing operation for a second time period.

Example B14. The reconfigurable processor of example B1, wherein the interface unit includes a program control register having a cache_arg_writes_for_later bit that, if set, causes the FAL controller to cache FAL commands received from the runtime program running on the host processor, the cached FAL commands to be executed at a later time.

Example B15. The reconfigurable processor of example B1, wherein the interface unit includes a program control register having a do_arg_load_even_if_running bit that, if set, causes a configurable unit in the array of configurable units to accept and load an argument data value received in a (value, control) tuple even if the configurable unit is in an execute state.

Example B16. A method for loading argument registers in a reconfigurable processor from a runtime program running on a host processor, the reconfigurable processor including an interface agent coupled to the host processor through an external interface link, an interface unit coupled to the interface unit through an internal network, and an array of configurable units connected by a bus system to the interface unit, a program load controller, and a fast argument load (FAL) controller, a configurable unit in the array of configurable units including a configuration data store, organized as a shift register, to store configuration data, the configuration data store also including individually addressable argument registers respectively comprising word-sized portions of the shift register adapted to provide arguments to the configurable unit, the method comprising: storing, by the runtime program, a configuration file, including sub-files of the configuration data, in a memory accessible by the reconfigurable processor; sending a program load command from the runtime program to the program load controller in the reconfigurable processor; receiving the program load command at the program load controller and responding by: reading a portion of the configuration file from the memory; sending a first signal from the program load controller to the configurable unit; and distributing the sub-files from the portion of the configuration data read from the memory to the configurable unit; receiving the sub-files via the bus system at the configurable unit; and loading the received sub-files into the configuration data store, including the argument registers, by sequentially shifting data of the received sub-files into the shift register; and storing, by the runtime program, an argument load file including argument load information the memory accessible by the reconfigurable processor; sending an FAL command from the runtime program to the FAL controller in the reconfigurable processor; receiving the FAL command at the FAL controller and responding by executing an FAL process that includes: sending a second signal from the FAL controller to the configurable unit; reading a portion of the argument load information from the memory, the portion of the argument load information including one or more argument values to be loaded into respective argument registers in the configurable unit; distributing the portion of the argument load information to the configurable unit; receiving the argument load information via the bus system at the configurable unit; and loading the one or more argument values into the respective argument registers without shifting the one or more argument values through the shift register.

Example B17. The method of example B16, further comprising: writing, by the runtime program, a first starting physical memory address of the configuration file in the memory to a program load address register of the program load controller; using the first starting physical memory address for the reading of the portion of the configuration file from the memory; writing, by the runtime program, a second starting physical memory address of the argument load file in the memory to an argument load address register of the FAL controller; and using the second starting physical memory address for the reading of the portion of the argument load information from the memory.

Example B18. The method of example B16, further comprising writing, by the runtime program, a cache_arg_writes_for_later bit of a program control register in the interface unit, and in response, caching FAL commands received from the runtime program to be executed at a later time.

Example B19. The method of example B16, further comprising writing, by the runtime program, a do_arg_load_even_if_running bit in a program control register in the interface unit, and in response to the bit being set, accepting and loading an argument data value received at the configurable unit in a (value, control) tuple even if the configurable unit is in an execute state.

Example B20. The method of example B16, further comprising writing, by the runtime program, selected bits of a multi-bit program control register in the interface unit to trigger execution of a process selected from among multiple processes, the multiple processes including the FAL process and the program load process, wherein the interface unit includes the program load controller and the FAL controller.

*** THE FOLLOWING CLAIMS WILL BE USED FOR CLAUSES/EXAMPLES ONLY

Example B21. The method of example B20, further comprising clearing, by the interface unit after completion of the selected process, a bit of the program control register that had been set by the runtime program to trigger execution of the selected process.

Example B22. The method of example B17, further comprising writing, by the runtime program, a file size of the argument load file in the memory to an argument load size register of the FAL controller.

Example B23. The method of example B16, further comprising, recognizing the FAL command, by the FAL controller, in response to a write to at least one of an argument load address register, an argument load size register, or one or more argument load bits of the program control register by the runtime program, wherein the interface unit includes the FAL controller, the argument load address register, the argument load size register, and the program control register;

Example B24. The method of example B16, further comprising recognizing the program load command, by the program load controller, in response to a write to at least one of a program load address register or one or more program load bits of a program control register by the runtime program, wherein the interface unit includes the program load controller, the program load address register, and the program control register.

Example B25. The method of example B24, the program load process further comprising: broadcasting a program load signal to configurable units of the array of configurable units, including the configurable unit, to transition the configurable units into a state of awaiting configuration sub-files; generating memory access requests to a memory starting at an address stored in the program load address register; receiving the sub-files of the configuration data from the memory; and distributing the sub-files of the configuration data to the configurable units.

Example B26. The method of example B16, wherein the argument load file is a first argument load file having a first size, stored at a first starting memory location, and containing first argument load information, the method further comprising: writing, by the runtime program, the first starting memory location to an argument load address register in the interface unit; writing, by the runtime program, the first size to an argument load size register in the interface unit; writing, by the runtime program, an argument load bit of a program control register in the interface unit to send the FAL command to the FAL controller to initiate execution of the FAL process; storing, by the runtime program, a second argument load file having a second size and containing second argument load information to a second starting memory location in the memory; upon completion of the FAL process by the reconfigurable processor, writing, by the runtime processor, the second starting memory location, the first size, and the argument load bit to the argument load address register, the argument load size register, and the program control register, respectively, to send a second FAL command to the FAL controller; and detecting, by the FAL controller, the second FAL command, and in response, initiating a second FAL process to load argument values of the second argument load information into argument registers of one or more configurable units in the array of configurable units.

Example B27. The reconfigurable processor of example B1, wherein the runtime program running on the host processor maintains a pair of argument load files in memory, and repeatedly alternates between executing the FAL process using a first argument load file of the pair of argument load files while updating a second argument load file of the pair of argument load files.

Example B28. The reconfigurable processor of example B7, wherein the FAL controller is further configured to: begin the FAL process in response to the FAL command by broadcasting an argument load signal to configurable units in the array of configurable units, including the configurable unit, to place the configurable units into an argument load state; retrieve a first portion of the argument load file by issuing a memory access request to a physical address stored in the argument load address register once the argument load signal has been received by all of the configurable units in the array of configurable units; and distribute (value, control) tuples of the first portion of the argument load file, received in response to the memory access request, to the configurable units the array of configurable units over a vector network of the bus system, one (value, control) tuple at a time.

Example B29. The reconfigurable processor of example B28, wherein the configurable unit, while in the argument load state, is configured to load data contained in a received (value, control) tuple directly into an argument register of the individually addressable argument registers of the configurable unit indicated by the received (value, control) tuple, the configurable unit configured to subsequently report completion of the argument load by sending a response packet to the FAL controller over a scalar network of the bus system, the response packet having a control bit that is set.

Example B30. The reconfigurable processor of example B28, wherein the FAL controller is configured to increment a counter in response to sending a (value, control) tuple of the (value, control) tuples of the argument load file to any configurable unit in the array of configurable units, and to decrement the counter in response to receiving a response packet with a control bit set from any configurable unit in the array of configurable units.

Example B31. The reconfigurable processor of example B30, wherein once all of the (value, control) tuples have been read from the argument load file and the counter equals zero, the FAL process is complete, and the FAL controller is configured to deassert the argument load signal, set an argument load complete bit of a tile status register, and generate an interrupt to the host processor, in response.

Example B32. The reconfigurable processor of example B31, wherein the interface unit, once the FAL process is complete, returns either to an idle state or to an execute state, depending on which argument load bit of the program control register was written by the host processor to initiate the argument FAL process.

Example B33. The reconfigurable processor of example B1, wherein configurable units in the array of configurable units include a plurality of address generation and coalescing units (AGCUs), including a master AGCU and one or more slave AGCUs, in addition to the configurable unit, wherein the master AGCU comprises the interface unit.

Example B34. The reconfigurable processor of example B33, wherein the master AGCU includes the FAL controller and the program load controller.

Example B35. The reconfigurable processor of example B33, wherein configurable units in the array of configurable units, in addition to the master AGCU and one or more slave AGCUs, include pattern memory units (PMUs), pattern compute units (PCUs), and switches, each switch having eight ports useable to connect to four neighboring configurable units and to neighboring switches in each of four directions.

Example B36. The reconfigurable processor of example B1, wherein the configurable units in the array of configurable units are arranged in two dimensions, M×N, and communicate over the bus system, which comprises an (M+1)×(N+1) switch fabric.

Example B37. The reconfigurable processor of example B1, wherein the bus system includes three physical networks: a vector network to carry the (value, control) tuples from the FAL controller to the configurable units in the array of configurable units, a scalar network to carry response packets from the configurable units in the array of configurable units to the FAL controller, and a control network.

Example B38. The reconfigurable processor of example B37, wherein the vector network is packet-switched and transfers vector packets each comprising a multi-word-sized vector payload and a header that includes a destination, a sequence ID, and a virtual channel (flow control class).

Example B39. The reconfigurable processor of example B37, wherein the scalar network is packet-switched and transfers scalar packets each comprising a word-sized payload and a header that includes information such as a destination and a type.

Example B40. The reconfigurable processor of example B37, wherein the control network is circuit switched and uses a plurality of wires, wherein each wire being pulsed to transmit a control token.

Example B41. The reconfigurable processor of example B1, wherein the argument load file has a minimum size of zero and a maximum size equaling a maximum number of the (value, control) tuples representable by a number of bits of in the argument load size register.

Example B42. The reconfigurable processor of example B41, wherein the argument load file has a minimum size equal to two times a number of configurable units in the array of configurable units, so as to allow at least one (value, control) tuple for each of the configurable units.

Example B43. The reconfigurable processor of example B28, wherein the FAL controller is configured to send the memory access request to a memory interface agent via the internal network, and to receive the first portion of the argument load file from the memory interface agent via the internal network.

Example B44. The reconfigurable processor of example B43, wherein the FAL controller is configured to continue reading data from the argument load file one block of data at a time over the internal network until as many of the (value, control) tuples as are specified in the argument load size register have been read and distributed; wherein the memory interface agent is configured to return the one block of data via the internal network to the FAL controller in response to a single memory access request, wherein the block of data hold a plurality of the (value, control) tuples.

Example B45. The reconfigurable processor of example B44, wherein the (value, control) tuples are distributed over the vector network to the configurable units of the array of configurable units using dimension-order routing, wherein a row dimension of the array of configurable units is traversed before a column dimension of the array of configurable units, to a row and column destination of the configurable unit specified in the respective (value, control) tuple.

Example B46. The reconfigurable processor of example B45, wherein the configurable unit is configured to send a response packet over a scalar network to the FAL controller after a value received in a (value, control) tuple is stored to an argument register specified by the (value, control) tuple.

Example B47. The reconfigurable processor of example B28, wherein the FAL controller is configured to perform the FAL process without indicating to the configurable units how many argument registers will be loaded during the FAL process, and the configurable units are configured accept and process the (value, control) tuples received as long as they are in the argument load state.

Example B48. The reconfigurable processor of example B28, wherein the FAL controller is configurable to transition from the argument load state to an IDLE state, to abandon execution of the FAL process, and to set an error bit of a tile status register in response to receiving an error during the memory access.

Example B49. The reconfigurable processor of example B1, wherein the shift register comprises a multi-bit wide shift chain that includes the individually addressable argument registers, and the configurable unit is configured to provide multiple access modes to an argument register of the individually addressable argument registers, the multiple access modes including: a first access mode of sequentially shifting argument data into the argument register via the multi-bit wide shift chain; and a second access mode of accessing the argument register directly without changing data loaded into other parts of the shift register.

Example B50. The reconfigurable processor of example B13, wherein the first period of time is one second, and the second period of time is one hour.

Example B51. The reconfigurable processor of example B11, wherein the runtime program is configurable to allocate a plurality of sets of configurable units in the array to implement respective execution fragments of the data processing operation.

Example B52. The reconfigurable processor of example B11, wherein the runtime program uses first and second argument load files in memory, and repeatedly alternates between executing the first argument load file while updating the second argument load file.

FURTHER OR ADDITIONAL CONSIDERATIONS

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods, and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

The invention claimed is:

1. A reconfigurable processor comprising:
an array of configurable units connected by a bus system,
  a configurable unit in the array of configurable units including a configuration data store, organized as a shift register, to store configuration data, the configuration data store also including individually addressable argument registers respectively comprising word-sized portions of the shift register adapted to provide arguments to the configurable unit, the configurable unit further including program load logic to receive sub-files of the configuration data via the bus system and to load the received sub-files into the configuration data store, including the argument registers, by sequentially shifting the received sub-files into the shift register, the configurable unit further including argument load logic to receive argument data via the bus system and load the received argument data into the argument registers without shifting the received argument data through the shift register;
a program load controller associated with the array to respond to a program load command by executing a program load process, including sending a first signal to the configurable unit, and subsequently distributing a configuration file comprising the sub-files of configuration data to the configurable unit in the array as specified in the configuration file; and
a fast argument load (FAL) controller associated with the array to respond to an FAL command by executing an FAL process, including sending a second signal to the configurable unit, and subsequently distributing (value, control) tuples to the configurable unit as specified in an argument load file.

2. The reconfigurable processor of claim 1, wherein the shift register comprises a multi-bit wide shift chain that includes the individually addressable argument registers, and the configurable unit is configured to provide multiple access modes to an argument register of the individually addressable argument registers, the multiple access modes including:
  a first access mode of sequentially shifting argument data into the argument register via the multi-bit wide shift chain; and
  a second access mode of accessing the argument register directly without changing data loaded into other parts of the shift register.

3. The reconfigurable processor of claim 1, wherein the configurable units in the array of configurable units are further connected in an interconnect topology, separate from, and in addition to, the bus system, the interconnect topology comprising a daisy chain used by the configurable unit to indicate completion of at least a portion of loading the received sub-files of the configuration data or loading the received argument data.

4. The reconfigurable processor of claim 1, wherein the configurable unit is configurable to transition to an IDLE state, to abandon execution of the FAL process, and to set an error bit of a tile status register in response to receiving an error during a memory access.

5. The reconfigurable processor of claim 1, wherein the argument load logic in the configurable unit is configured to cause a component state machine in the configurable unit to transition from a current state to an argument load state in response to receiving the second signal.

6. The reconfigurable processor of claim 5, wherein the current state of the configurable unit is one of idle, program load, checkpoint, execute, or quiesce.

7. The reconfigurable processor of claim 5, wherein the configurable unit is configured to, while in the argument load state, receive a (value, control) tuple, and write a value included in the (value, control) tuple to an argument register of the individually addressable argument registers identified by a register identifier included in the (value, control) tuple, and signal completion of the write of the value to the argument register by sending a response packet to the FAL controller.

8. The reconfigurable processor of claim 7, wherein the FAL controller is configured to send the (value, control) tuple to the configurable unit over a vector network of the bus system using dimension order routing, and the configurable unit is configured to send the response packet including a set control bit to the FAL controller over a scalar network of the bus system.

9. The reconfigurable processor of claim 7, wherein the configurable unit remains in the argument load state until it receives a different command.

10. The reconfigurable processor of claim 1, wherein the argument load file includes a list of (value, control) tuples specifying values to be written to argument registers, the list containing a (value, control) tuple for argument registers to be written by the FAL controller during a single invocation of the FAL process.

11. The reconfigurable processor of claim 10, wherein each (value, control) tuple includes a value word of data to be written to an argument register and a control word of data indicating a location of an argument register of the argument registers to be written.

12. The reconfigurable processor of claim 11, wherein the control word of data includes an ID of the argument register to be written and a destination identification of the configurable unit containing the argument register to be written.

13. The reconfigurable processor of claim 12, wherein the destination identification identifies a row in the array of configurable units containing the configurable unit, a column in the array of configurable units containing the configurable unit, and a type of the configurable unit, the type being one of memory unit, compute unit, switch, and interface unit.

14. A method for operating a reconfigurable processor that includes an array of configurable units connected by a bus system to a program load controller and a fast argument load (FAL) controller, a configurable unit in the array of configurable units including a configuration data store, organized as a shift register, to store configuration data, the configuration data store also including individually addressable argument registers respectively comprising word-sized portions of the shift register adapted to provide arguments to the configurable unit, the method comprising:
receiving a program load command and responding by:
obtaining a configuration file including sub-files of the configuration data;
sending a first signal from the program load controller to the configurable unit; and
distributing the sub-files of configuration data to the configurable unit;
receiving the sub-files of the configuration data via the bus system at the configurable unit; and
loading the received sub-files into the configuration data store, including the argument registers, by sequentially shifting data of the received sub-files into the shift register; and
receiving an FAL command and responding by executing an FAL process that includes:
sending a second signal from the FAL controller to the configurable unit;
obtaining argument load information including one or more argument values to be loaded into respective argument registers in the configurable unit;
distributing the argument load information to the configurable unit;
receiving the argument load information via the bus system at the configurable unit; and
loading the one or more argument values into the respective argument registers without shifting the one or more argument values through the shift register.

15. The method of claim 14, wherein the argument load information includes one or more (value, control) tuples that respectively provide one argument value and an identifier of a respective argument register in the configurable unit, the method further comprising:
sending the one or more (value, control) tuples from the FAL controller to the configurable unit over a vector network of the bus system; and
sending, by the configurable unit to the FAL controller over a scalar network of the bus system, a response packet for each (value, control) tuple processed, the response packet including a set control bit to indicate completion of the loading of one of the one or more argument values into its respective argument register.

16. The method of claim 15, wherein the one or more (value, control) tuples are routed through the vector network of the bus system using dimension-order routing; and
the response packet for each (value, control) tuple processed is routed through the scalar network of the bus system using dimension-order routing.

17. The method of claim 14, wherein the argument load information is included in an argument load file comprising a list of (value, control) tuples to be processed during a single invocation of the FAL process, each (value, control) tuple including a value word of data to be written to an argument register and a control word of data including an ID of the argument register to be written and a destination identification of a target configurable unit in the array of configurable units containing the argument register to be written, the destination identification identifying a row in the array of configurable units containing the target configurable unit, a column in the array of configurable units containing the target configurable unit, and a type of the target configurable unit, the type being one of memory unit, compute unit, switch, or interface unit.

18. The method of claim 14, further comprising transitioning the FAL controller to an IDLE state, abandoning execution of the FAL process, and setting an error bit of a tile status register in response to receiving an error during a memory access.

19. The method of claim 14, further comprising transitioning argument load logic in the configurable unit from a current state to an argument load state in response to receiving the second signal, the current state being one of idle, program load, argument load, checkpoint, execute, or quiesce.

20. The method of claim 19, further comprising:
receiving, while the argument load logic is in the argument load state, a (value, control) tuple at the configurable unit;
writing a value included in the (value, control) tuple to an argument register of the individually addressable argument registers identified by a register identifier included in the (value, control) tuple; and
sending a response packet with a set control bit to the FAL controller after completion of the writing.

\* \* \* \* \*